US007810020B2

(12) United States Patent
Omura et al.

(10) Patent No.: US 7,810,020 B2
(45) Date of Patent: Oct. 5, 2010

(54) INFORMATION RETRIEVAL SYSTEM

(75) Inventors: Kengo Omura, Kanagawa (JP); Takeshi Nagamine, Kanagawa (JP); Yutaka Andoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1075 days.

(21) Appl. No.: 11/345,334

(22) Filed: Feb. 2, 2006

(65) Prior Publication Data

US 2007/0074123 A1    Mar. 29, 2007

(30) Foreign Application Priority Data

Sep. 27, 2005 (JP) .............................. 2005-280274

(51) Int. Cl.
*G06F 17/00* (2006.01)

(52) U.S. Cl. ................... 715/200; 715/255; 707/736; 707/706

(58) Field of Classification Search ......... 715/200–203, 715/255; 707/3, 736, 705, 706
See application file for complete search history.

(56) References Cited

U.S. PATENT DOCUMENTS

| | | | | |
|---|---|---|---|---|
| 6,275,258 B1 * | 8/2001 | Chim | ..................... | 348/211.12 |
| 6,369,846 B1 * | 4/2002 | Katsumi | .................... | 348/14.01 |
| 6,597,738 B1 * | 7/2003 | Park et al. | ............... | 375/240.16 |
| 6,728,345 B2 * | 4/2004 | Glowny et al. | ........... | 379/88.22 |
| 6,853,716 B1 * | 2/2005 | Shaffer et al. | .......... | 379/202.01 |
| 7,444,377 B2 * | 10/2008 | Fujimoto et al. | ............ | 709/206 |
| 2002/0056123 A1 * | 5/2002 | Liwerant et al. | ............... | 725/87 |
| 2002/0109770 A1 * | 8/2002 | Terada | ...................... | 348/14.08 |
| 2003/0009767 A1 * | 1/2003 | Narita et al. | ................... | 725/97 |
| 2003/0020602 A1 * | 1/2003 | Hata et al. | ................ | 340/425.5 |
| 2003/0126147 A1 * | 7/2003 | Essafi et al. | ................. | 707/100 |
| 2003/0130016 A1 * | 7/2003 | Matsuura et al. | ............ | 455/569 |
| 2003/0187632 A1 * | 10/2003 | Menich | ......................... | 704/1 |
| 2004/0083101 A1 * | 4/2004 | Brown et al. | ................. | 704/235 |
| 2004/0111756 A1 * | 6/2004 | Stuckman et al. | ........... | 725/142 |
| 2004/0264811 A1 * | 12/2004 | Yano et al. | ................... | 382/306 |
| 2006/0053042 A1 * | 3/2006 | Yoshimura et al. | ............. | 705/8 |
| 2006/0100880 A1 * | 5/2006 | Yamamoto et al. | .......... | 704/270 |
| 2006/0215584 A1 * | 9/2006 | Yoshida | ..................... | 370/260 |
| 2006/0248075 A1 * | 11/2006 | Shimomori et al. | ............ | 707/5 |
| 2007/0011233 A1 * | 1/2007 | Manion et al. | ............... | 709/204 |
| 2007/0071206 A1 * | 3/2007 | Gainsboro et al. | .......... | 379/168 |
| 2009/0106617 A1 * | 4/2009 | Katis et al. | ................... | 714/748 |

FOREIGN PATENT DOCUMENTS

| | | | |
|---|---|---|---|
| JP | A 2002-58069 | 2/2002 | |
| JP | A 2002-99675 | 4/2002 | |

* cited by examiner

*Primary Examiner*—Thu Huynh
(74) *Attorney, Agent, or Firm*—Oliff & Berridge, PLC

(57) ABSTRACT

An information retrieval system includes an information extracting portion that extracts episodic information to be set as a cue for searching conference record information that stores contents on a conference for personal information, and an information storage portion that stores the episodic information extracted from the information extracting portion and the personal information associated with the episodic information. The personal information of a participant is searched for, personal information being obtained from the conference that a system user attended.

12 Claims, 23 Drawing Sheets

FIG. 17

MSN1~9 THUMBNAIL
BTP1~9 REPRESENTATIVE SHOT DISPLAY BUTTON

FIG. 19  PARTICIPANT DISPLAY SCREEN

MULTIMEDIA CATALOGUE OF PEOPLE WHO WERE IN CONFERENCE

FILE(F)  EDIT(E)  VIEW(V)  SET(S)  RETRIEVE(R)

TIME SERIES DISPLAY SCREEN

FACE AND NAME OF CONFERENCE PARTICIPANT
—— 2005.2.14 AKASAKA HEAD OFFICE PATENT RESEARCH ——

NAME LIST DISPLAY CHANGE BUTTON

NUMBER MEANS NUMBER OF TIMES CONVERSE WITH YOU

15 — TAKASHI ASAI  0 — NORIKO KOBAYASI  5 — SHIN SAKAI
3 — JUN SINOHARA  2 — AYAKO NISI  3 — HIRO WATABE

MATERIAL USED IN CONFERENCE (SLIDE OR WB RECORD)

PERSONAL INFORMATION

TAKASHI ASAI

NAME: TAKASHI ASAI
COMPANY: XX CORPORATION
DEPARTMENT: SALES
GROUP: PROJECT CONSULTANT
CLASS: ASSISTANT MANAGER
TITLE: SENIOR CONSULTANT
EMPLOYEE NUMBER: 19654
TELEPHONE: 7-5-19654
E-MAIL: takashi.asai@xxxxx.co.jp

MEETING HISTORY

FOLLOWING 5 CONFERENCES WERE PRESENT WITH MR. TAKASHI ASAI

| DATE | PLACE | AGENDA | MEMO | VIDEO |
|---|---|---|---|---|
| 2005.2.14 | AKASAKA HEAD OFFICE | PATENT RESEARCH | | PLAY |
| 2004.12.21 | AKASAKA HEAD OFFICE | PATENT RESEARCH | | PLAY |
| 2004.10.2 | YOKOHAMA BRANCH | PROJECT LEADER WORKSHOP | | PLAY |
| 2004.9.16 | HADANO RESEARCH CENTER | TECHNOLOGY EXHIBITION | | PLAY |
| 2003.5.16 | AKASAKA HEAD OFFICE | PROFESSOR XX LECTURE | | PLAY |

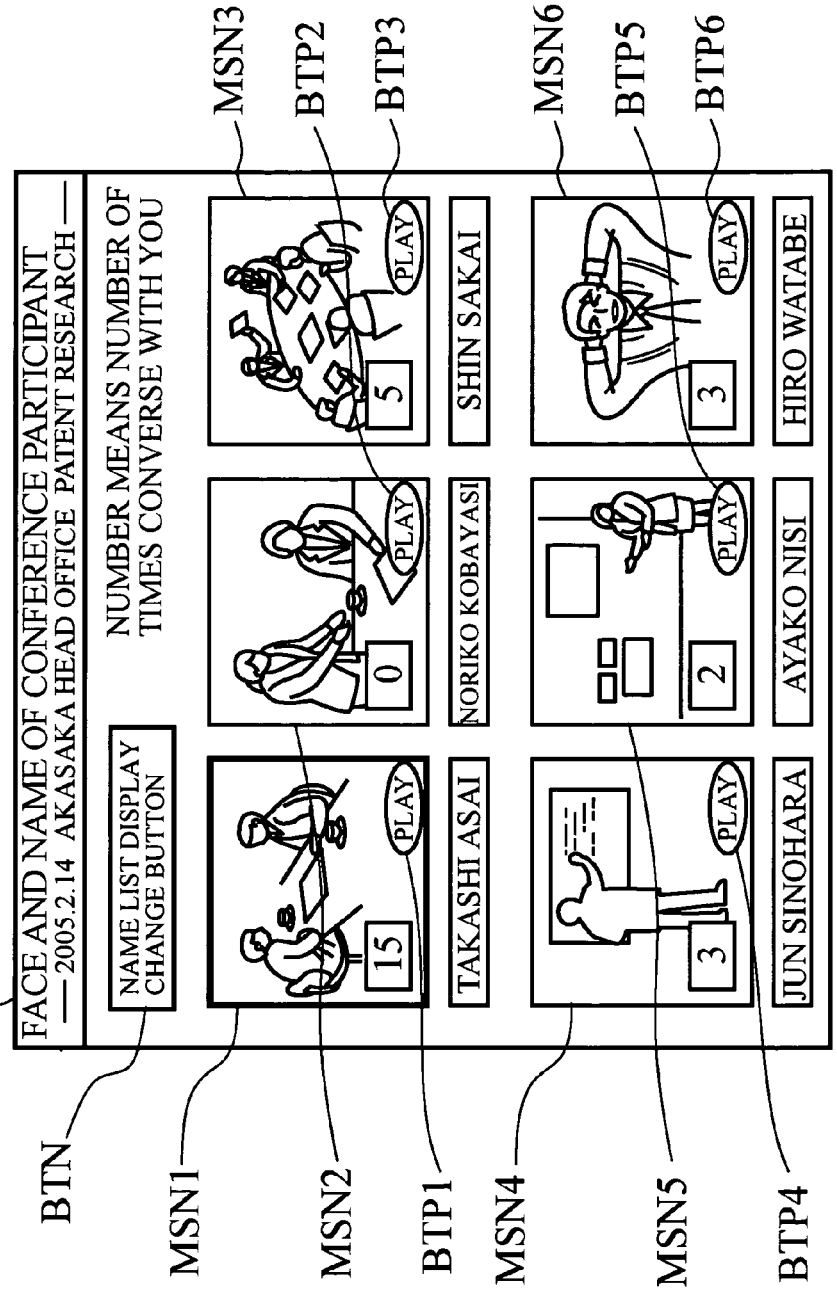

FIG. 22

SEARCH DISPLAY SCREEN

SEARCH SCREEN
FILE(F) EDIT(E) VIEW(V) SET(S) RETRIEVER(R)
FORGOTTEN PERSON DISPLAY SCREEN
RESULT

[Grid of person thumbnails labeled A, B, C, D, E, F, G, H, I (or similar), each with a PLAY button, page 2/3]

CONDITION

EPISODIC ATTRIBUTE

| CONVERSATION IN CONFERENCE | REMARK IN CONFERENCE | DISTANCE IN CONFERENCE |
|---|---|---|
| ◉ MOST FREQUENT | ◉ MOST FREQUENT | ◉ NEAREST |
| ○ 10 TIMES OR MORE | ○ 10 TIMES OR MORE | ○ LESS THAN 3 M |
| ○ 1 TO 9 TIMES | ○ 1 TO 9 TIMES | ○ 3 TO LESS THAN 5 M |
| ○ LEAST FREQUENT | ○ LEAST FREQUENT | ○ 5 M OR MORE |
| ○ NONE | ○ NONE | ○ FARTHEST |
| ○ UNKNOWN | ○ UNKNOWN | ○ UNKNOWN |

CONFERENCE ATTRIBUTE

| TYPE OF CONFERENCE | PLACE TO MEET | TIME TO MEET | NUMBER OF PARTICIPANTS |
|---|---|---|---|
| ○ NOTIFICATION & COMMUNICATION | ◉ HEAD OFFICE | ○ MORNING | ○ 5 OR LESS |
| ○ EVALUATION & EXAMINATION | ○ A BRANCH | ◉ AFTERNOON | ◉ 6 - 10 |
| ○ PROBLEM SOLVING | ○ B BRANCH | ○ UNKNOWN | ○ 10 - 20 |
| ○ LECTURE | ○ C BRANCH | | ○ 20 OR MORE |
| ○ TRAINING & EDUCATION | ○ D RESEARCH CENTER | DISPLAY OF MATERIAL | ○ UNKNOWN |
| ○ OTHERS | ○ E TRAINING CENTER | ◉ YES | |
| | ○ OTHERS & UNKNOWN | ○ NO | |
| | | ○ UNKNOWN | |

PERSON ATTRIBUTE

| CLASS | DEPARTMENT | SEX | ROLE IN CONFERENCE |
|---|---|---|---|
| ○ BOARD MEMBER | ◉ HEAD OFFICE STAFF | ◉ MALE | ○ CHAIRPERSON & MC |
| ○ (ASSISTANT) GENERAL MANAGER | ○ SALES FORCE | ○ FEMALE | ◉ PRESENTER & LECTURER |
| ○ MANAGER | ○ ENGINEERING | ○ UNKNOWN | ○ RATER & EXAMINER |
| ○ ASSISTANT MANAGER | ○ DEVELOPMENT | | ○ INSTRUCTOR |
| ○ CHIEF OR LOWER | ○ DESIGN RESEARCH | | ○ AUDIENCE |
| ○ UNKNOWN | ○ PRODUCTION | | ○ UNKNOWN |
| | ○ UNKNOWN | | |

BTP REPRESENTATIVE SHOT DISPLAY BUTTON
BTR◉ RADIO BUTTON

FIG. 23

INFORMATION RETRIEVAL SYSTEM

BACKGROUND OF THE INVENTION

1. Field of the Invention

This invention relates to an information retrieval system, which enables to search for personal information with ease on the basis of information, sound, or image relating to personal words and conducts.

2. Description of the Related Art

In the conference or meeting, when people meet for the first time, personal information is often exchanged by means of name card or business card to let each other know the name, position, division, and contact address. Then, the information relating to the conference is written in a memo and maintained and managed in association with the name card or the like. This is to supplement the personal information written on the name card and the information on the conference so that the management and search for the personal information and the information on the conference may be facilitated.

The name card, however, is easily lost or damaged. Therefore, the personal information needs to be managed electronically. As an information system that can exchange, manage, and search for electronic personal information, Japanese Patent Application Publication No. 2002-58069 describes an electronic name card exchange technique, whereby personal information is electronically exchanged by a mobile terminal.

It is to be noted that the information relating to the conference cannot be managed by the electronic name card only. Therefore, the personal information and the information on the conference have to be electronically supplemented by each other so as to facilitate the management of the personal information and the information on the conference. As an information management system that enables to store, manage, and search as described above, Japanese Patent Application Publication No. 2002-99675 describes a technique of storing and managing the electronic name cards in association with the information on the conference or the like, and displaying the electronic name card as a search result together with the information on the conference and the name cards of the conference participants.

In the above-described information management system, the personal information can be searched for with ease from the information on the conference or the like, whereas it is difficult for the system user to remember the information on the conferences, when the user attended several conferences. There is the problem that the personal information cannot be searched for, if the memory of the conference is faded.

SUMMARY OF THE INVENTION

The present invention has been made in view of the above circumstances and provides an information retrieval system, which enables to easily search personal information of a participant of a conference that a system user also attended.

According to one aspect of the present invention, there is provided an information retrieval system including: an information extracting portion that extracts episodic information to be set as a cue for searching conference record information that stores contents on a conference for personal information; and an information storage portion that stores the episodic information extracted from the information extracting portion and the personal information associated with the episodic information. The personal information of a participant is searched for, personal information being obtained from the conference that a system user attended.

According to the present invention, it is possible to search for the personal information by means of the episodic information, even if the information on the conference or the personal information is completely forgotten. In the same manner, if the episodic information is completely forgotten, it is possible to search for the episodic information, by means of the information on the conference or the personal information.

BRIEF DESCRIPTION OF THE DRAWINGS

Embodiments of the present invention will be described in detail based on the following figures, wherein:

FIG. 17 is a view showing a screen that displays a name list display screen;

FIG. 19 is a view showing a participant display screen;

FIG. 20 is a view showing the episodic information display screen on the participant display screen;

FIG. 22 is a view showing a search display screen; and

FIG. 23 is a view showing a forgotten person display screen.

DESCRIPTION OF THE EMBODIMENTS

A description will now be given, with reference to the accompanying drawings, of embodiments of the present invention.

Figure 1:
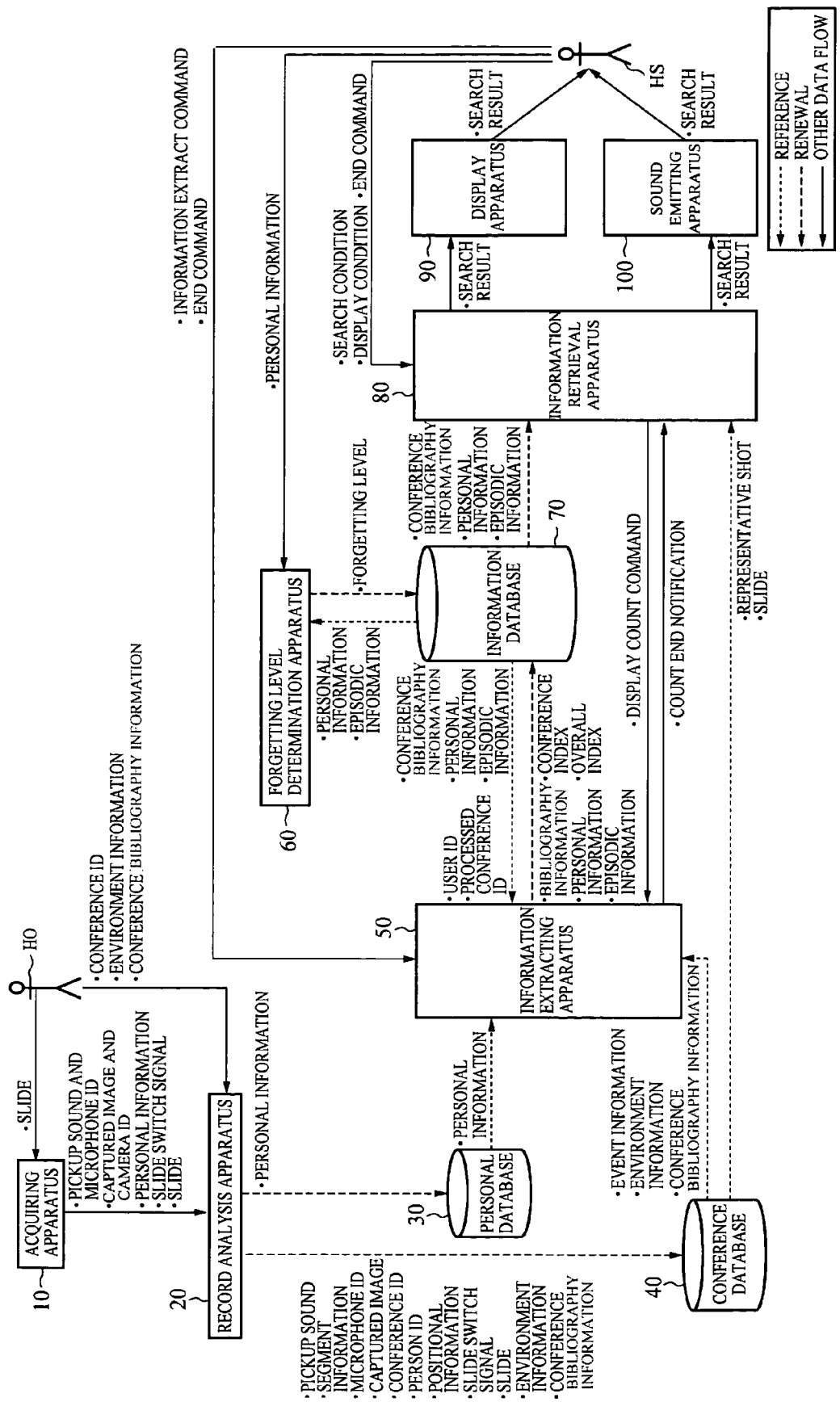
FIG. 1 is a configuration view of an information retrieval system in accordance with an embodiment of the present invention.

FIG. 1 is a configuration view of an information retrieval system in accordance with an embodiment of the present invention. The information retrieval system includes an acquiring apparatus 10, a record analysis apparatus 20, a personal database 30, a conference database 40, an information extracting apparatus 50, a forgetting level determination apparatus 60, an information database 70, an information retrieval apparatus 80, a display apparatus 90, and a sound emitting apparatus 100. The information extracting apparatus 50 serves as an information extracting portion. The forgetting level determination apparatus 60 serves as a forgetting level determination portion. The information database 70 serves as an information storage portion. The information retrieval apparatus 80 serves as an information retrieval portion.

Figure 2:
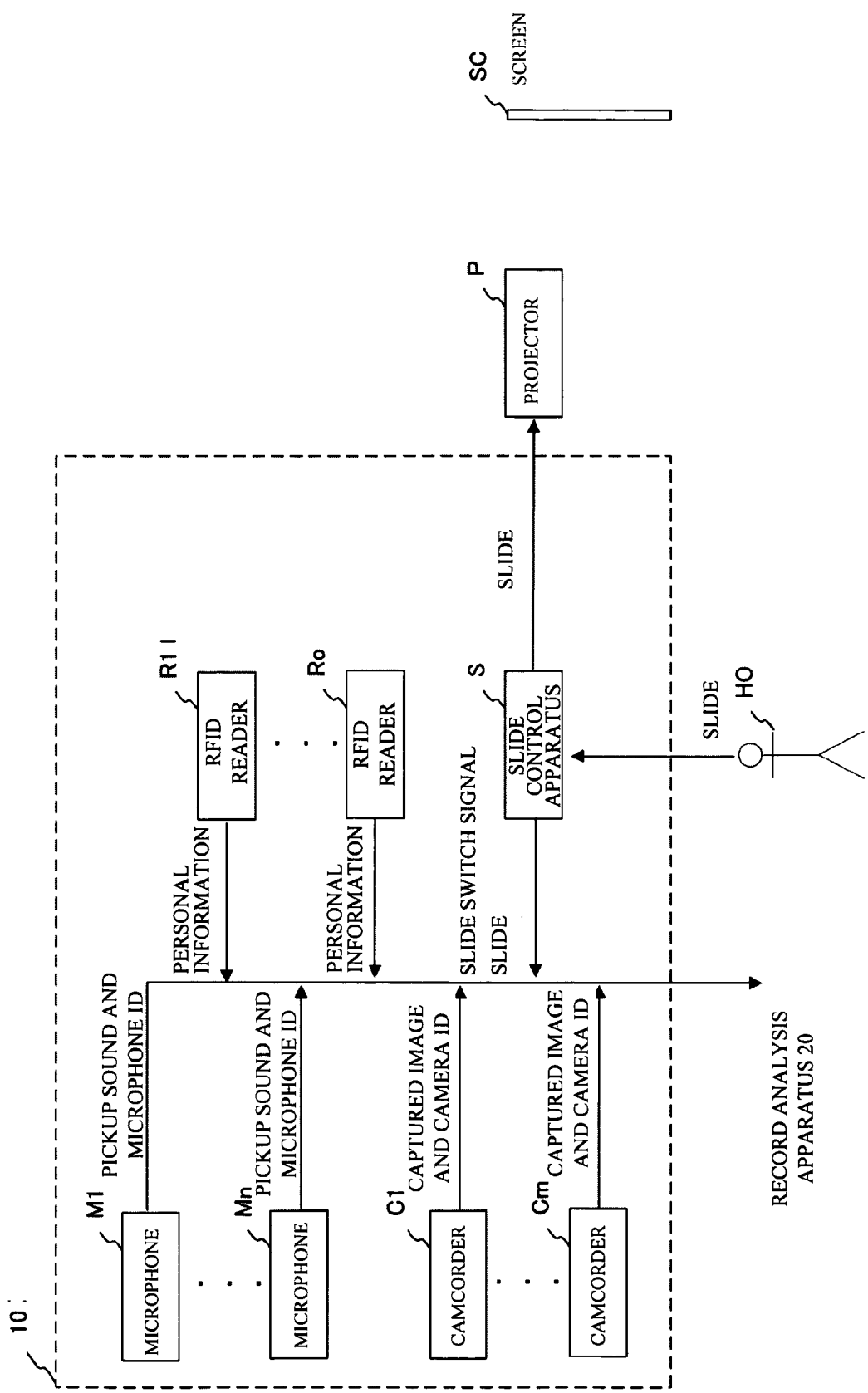
FIG. 2 exemplarily shows a configuration of an acquiring apparatus.

Referring now to FIG. 2, a configuration of the acquiring apparatus 10 will be described. FIG. 2 exemplarily shows the configuration of the acquiring apparatus 10. The acquiring apparatus 10 includes a microphone M, a camcorder C, an RFID reader R, and a slide control apparatus S. The camcorder C, the microphone M, the RFID reader R, and the slide control apparatus S are connected to the record analysis apparatus 20.

The microphone M is composed of, for example, a piezo electric microphone. Each participant carries one or more microphones M so as to record a sound and voice of each participant. In accordance with the present embodiment of the present invention, a description will be given of a case where each participant carries one microphone M. The microphone M transmits a pickup sound and information that identifies the microphone M that picked up the sound (hereinafter, referred to as microphone ID) to the record analysis apparatus 20.

The camcorder C is composed of, for example, a CCD camera. One or more camcorders C are installed to be capable of capturing the conference. The reason why multiple camcorders C are provided is to select a sharpest image of the participant from multiple images. In accordance with the present embodiment of the present invention, a description will be given of a case where three camcorders C are provided. The camcorder C transmits a captured image and the information that identifies the camcorder C that captured the image (hereinafter, referred to as camera ID) to the record analysis apparatus 20.

The above-described one or more camcorders C start capturing the image or one or more microphones M start picking up the sound when the conference starts. This makes it possible to correspond and associate the image captured by the camcorder C and the sound picked up by the microphone M in each time. The corresponding relation allows the user to extract the image from the captured image, the image corresponding to a time slot extracted by the analysis of the pickup sound, as will be described later in detail.

Multiple RFID readers R are installed in a conference room. Each participant carries an RFID tag. In accordance with the present embodiment of the present invention, a description will be given of a case where each participant carries one RFID tag. The RFID reader R is provided to be capable of communicating with the RFID tags carried by the participants.

The RFID reader R receives the information that identifies an individual emitted by the RFID tag (hereinafter, referred to as person ID), and then transmits the personal information that has been received to the record analysis apparatus 20. This enables to read the information transmitted by the RFID tag being carried by each participant. Also, positional information on the participants in the conference room is obtainable by use of the strength of the waves received by multiple RFID readers R.

The slide control apparatus S is composed of, for example, a personal computer. One or more slide control apparatuses S are provided. In accordance with the present embodiment of the present invention, a description will be given of a case where only one slide control apparatus S is installed. The slide control apparatus S is connected to the record analysis apparatus 20 and a projector P. A slide to be used in the conference is input into the slide control apparatus S by an operator HO.

The slide control apparatus S transmits the slide that has been stored to the projector P by the operator or automatically, and also transmits a signal representing that the display slide has been changed (hereinafter, slide switch signal) to the record analysis apparatus 20. The projector projects the slide that has been received onto a screen SC.

The record analysis apparatus 20 will now be described. The record analysis apparatus 20 is composed of, for example, a personal computer. The record analysis apparatus 20 is connected to the acquiring apparatus 10, the personal database 30, and the conference database 40.

The record analysis apparatus 20 receives the pickup sound, microphone ID, captured image, camera ID, personal information, slide switch information, and slide, from the acquitting apparatus 10. The operator HO inputs information that identifies the conference (hereinafter, conference ID), bibliographic information such as a place or date and time of the conference (hereinafter, referred to as conference bibliographic information or bibliography information), or environment information of the present system. The bibliographic information and the environment information will be described later in detail.

Subsequently, the pickup sound received from the acquiring apparatus 10 is accumulated on the conference database 40 as a pickup sound file. Then, a pickup sound file ID that identifies the pickup sound file received from the acquiring apparatus 10 is stored in the conference database 40 in association with the microphone ID and the conference ID.

Here, the pickup sound file ID is stored in association with the conference ID, as described above. This is because the microphone M having an identical microphone ID can be considered to be used in multiple conferences. Further, the record analysis apparatus 20 analyzes a sound pressure level of the pickup sound received from the acquiring apparatus 10 so as to extract the time slot while a participant is making a remark or speech (hereinafter, referred to as remark segment).

Figure 3:
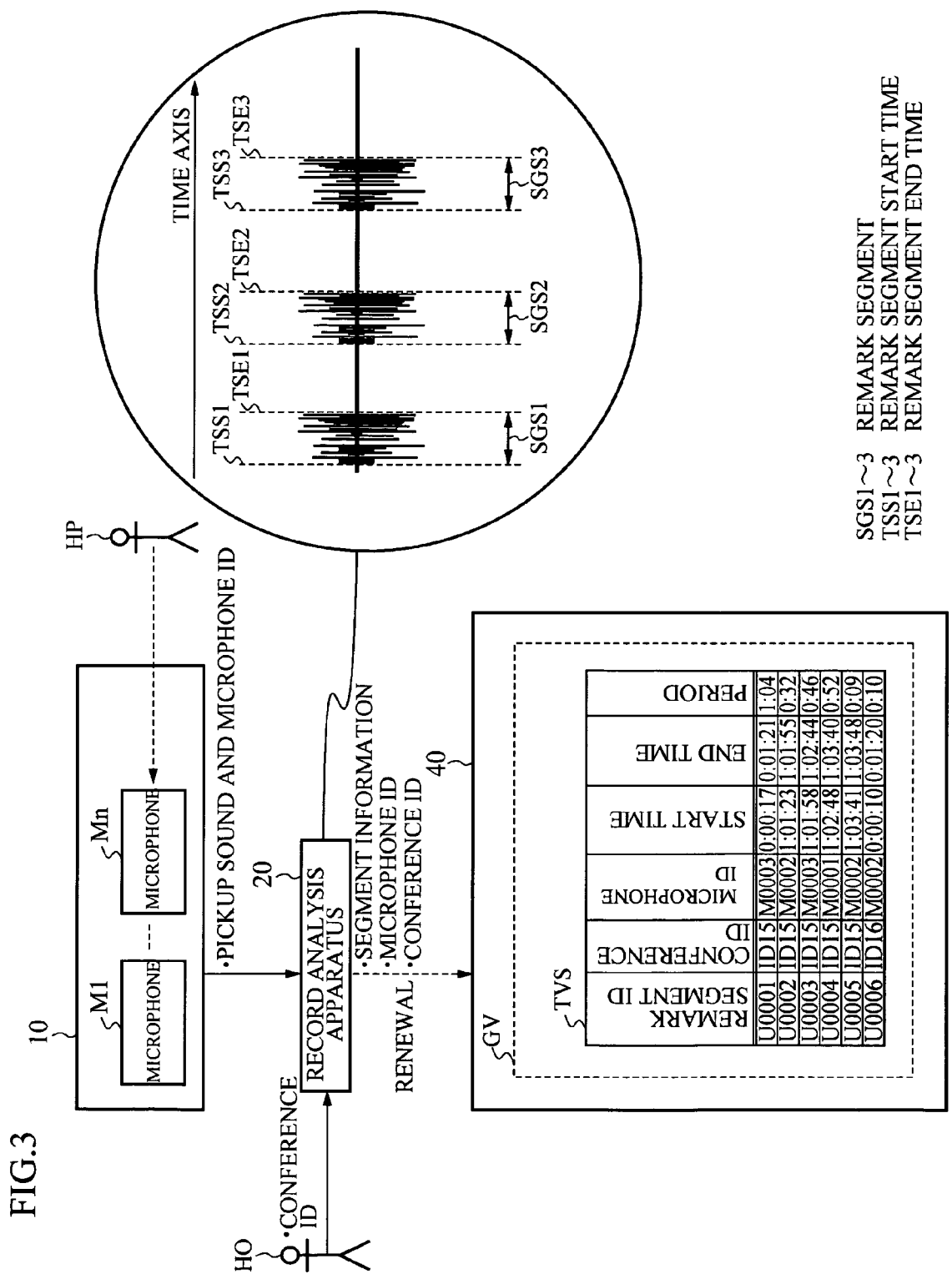
FIG. 3 is a view showing a relationship of a record analysis apparatus and an event table.

A description will now be given, with reference to FIG. 3, of an example of a method of storing the analysis result of the pickup sound analyzed by the record analysis apparatus 20. FIG. 3 is a view showing a relationship of the record analysis apparatus 20 and an event table on the information database.

As shown in FIG. 3, the record analysis apparatus 20 stores a start time TSS of the remark segment and an end time thereof TSE (hereinafter, referred to as segment information), which are extracted by the above-described analysis, in association with the microphone ID and the conference ID, in a remark event table TVS in the conference database 40.

The record analysis apparatus 20 stores the captured image received from the acquiring apparatus 10 in the conference database 40, as a captured-image file. Then, the record analysis apparatus 20 stores the image captured file, conference ID, and camera ID in association with one another, in the conference database 40.

Figure 4:
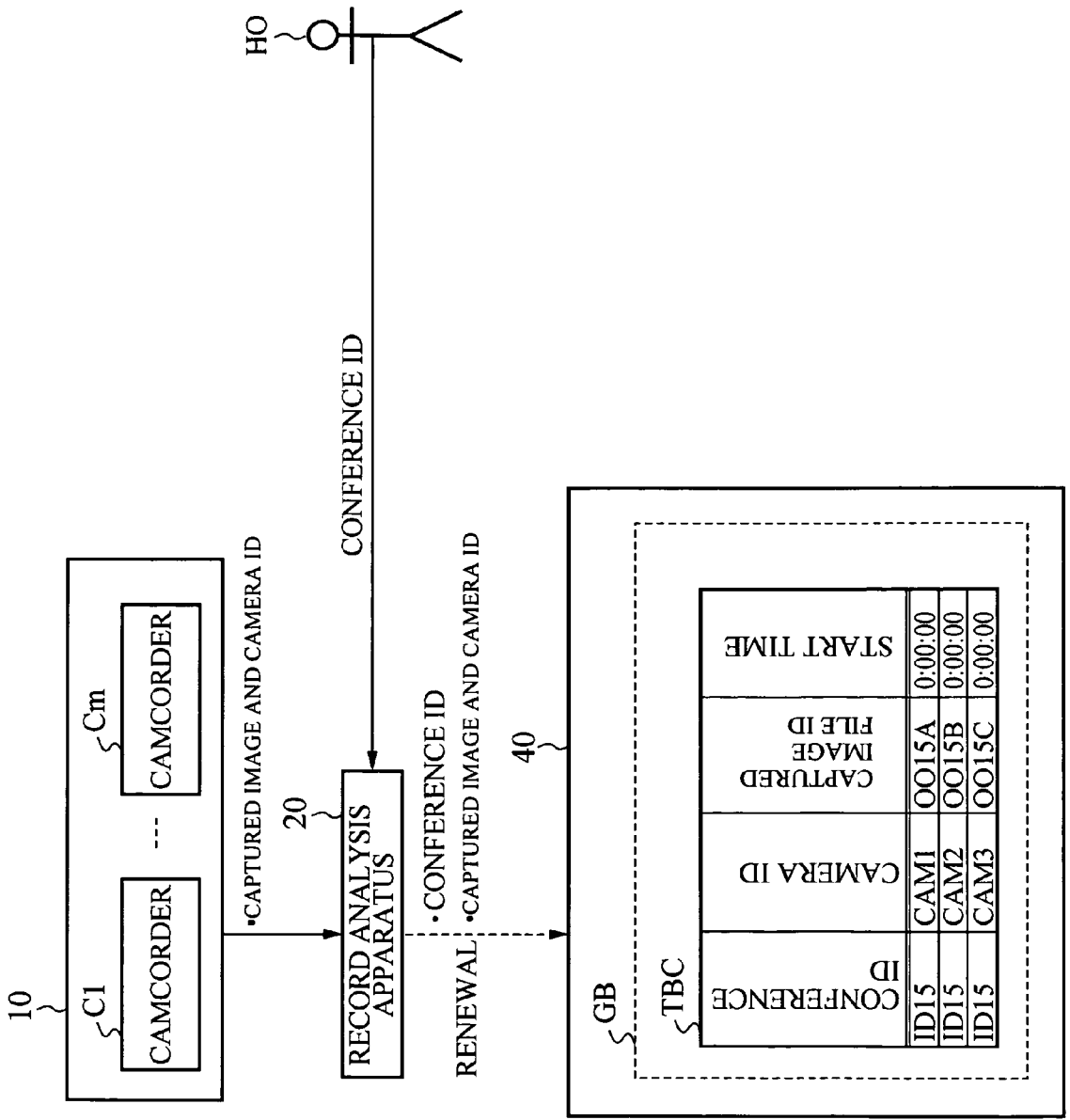
FIG. 4 is a view showing a relationship between the record analysis apparatus and a conference camera table.

Referring now to FIG. 4, the method of storing the analysis result will be exemplarily described. FIG. 4 is a view showing a relationship between the record analysis apparatus 20 and a conference camera table. The record analysis apparatus 20 stores the captured image in a conference camera table TBC of the conference database 40 in association with a captured file ID that identifies a captured file, the camera ID, and the conference ID input by the operator.

The record analysis apparatus 20 stores the personal information received from the acquiring apparatus 10 in the personal database 30. The record analysis apparatus 20 stores the positional information of the conference participant in the conference database 40, by analyzing the electric wave of the RFID tag received on the acquiring apparatus 10.

A description will be given, with reference to FIG. 5, of an example that the record analysis apparatus 20 stores the personal information on the database 30 and an example that the record analysis apparatus 20 stores the positional information of the participant on the conference database 40.

Figure 5:
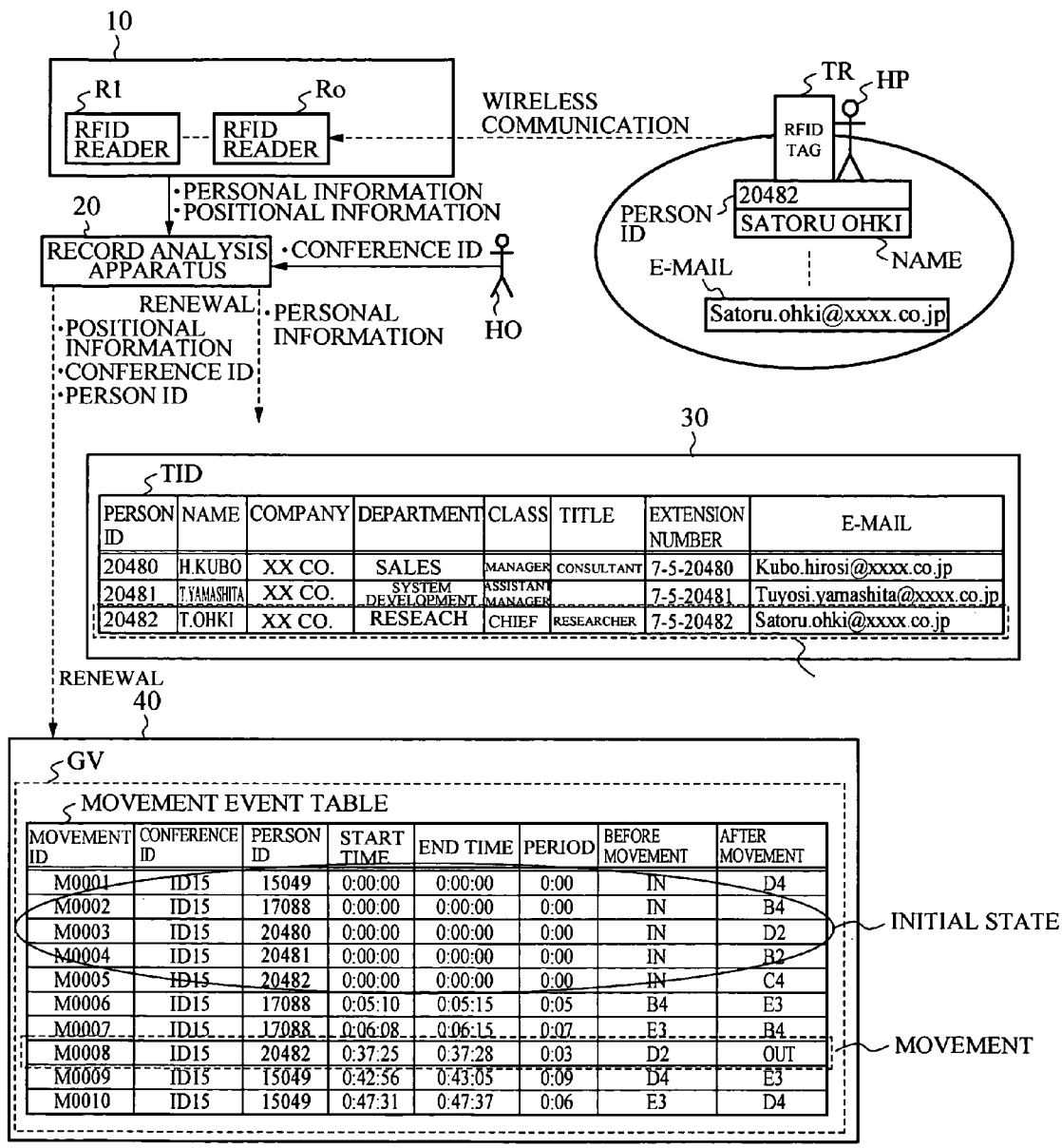
FIG. 5 is a view showing a relationship of personal information, positional information, and an information database.

FIG. 5 is a view showing a relationship of the personal information, positional information, and information database. Each participant has an RFID tag TR. The RFID tag TR carried by the participant emits electric waves of the personal information that includes the person ID, name, company name of the participant, department, class, title, and contact address such as an extension number, telephone number, e-mail address, and the like.

The record analysis apparatus 20 receives the personal information that the RFID reader R of the acquiring apparatus 10 has read from the RFID tag TR carried by the participant. Then, the record analysis apparatus 20 adds or updates the personal information on a personal information table TID of the personal database 30.

This makes it possible to automatically add the personal information related to the person who the system user first met in the conference. In addition, if the name is changed due to marriage or the like, the personal information can be updated to the latest one.

The record analysis apparatus 20 converts an intensity of the electric wave into distance information, the electric wave being emitted by the RFID tag that has been received by the RFID reader R, and obtains the positional information of the participant by carrying out a three-point measure or correcting the position.

The record analysis apparatus 20 also detects a movement of the conference participant with the use of the positional information that has been obtained. Then, the record analysis apparatus 20 stores the positional information, a start time of the movement, an end time of the movement, a place to move to, and a place to move from, on a movement event table TVM in the conference database 40 in association with the conference ID and person ID.

The record analysis apparatus 20 stores the slide received from the acquiring apparatus 10, in the conference database 40, as a slide file. The record analysis apparatus 20 stores in a slide table TBL on the conference database 40, the information that identifies the slide (hereinafter, referred to as slide ID) in association with the conference ID and the information on a time when each slide was displayed.

Figure 6:
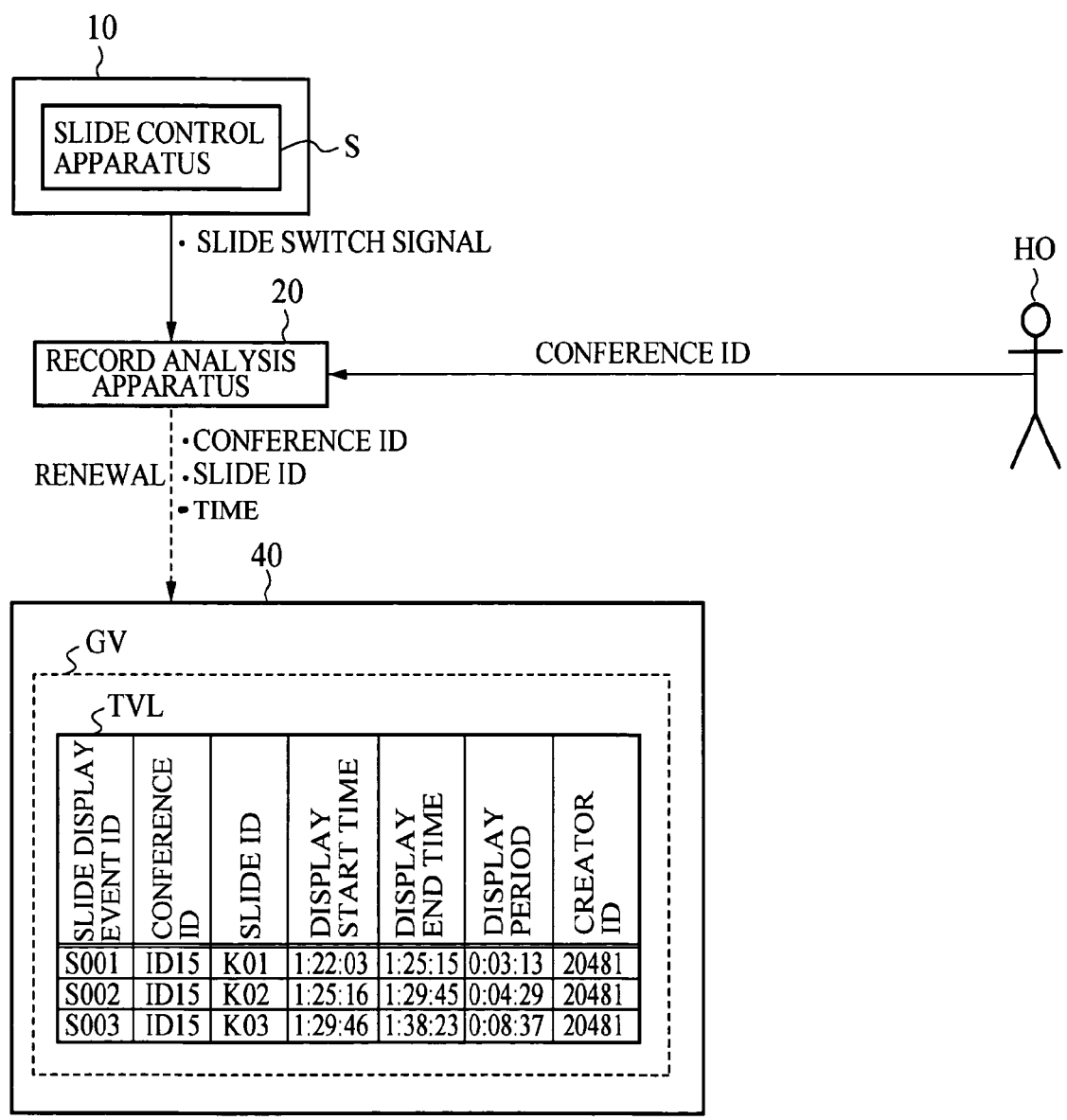
FIG. 6 is a view showing a relationship of the record analysis apparatus and a slide display event table.

Referring now to FIG. 6, a description will be given of an example of a method that the record analysis apparatus 20 stores the information of the time or the like when the slide was displayed, in the conference database 40. FIG. 6 is a view showing a relationship of the record analysis apparatus 20 and the slide display event table.

As shown in FIG. 6, the record analysis apparatus 20 determines the time when a given slide is displayed with the slide switch signal received by the acquiring apparatus 10. Subsequently, a display start time and display end time are stored in a slide display event table TVL in the conference database 40 in association with the slide ID and the conference ID.

The record analysis apparatus 20 stores the environment information input by the operator or the like in the conference database 40. Here, the environment information includes area environment information, camera environment information, and person environment information.

The area environment information denotes the environment information relating to divided areas when the conference room is divided into multiple areas. The camera environment information denotes the environment information relating to a range captured by the camcorder. The person environment information denotes the environment information relating to the person.

Figure 7:
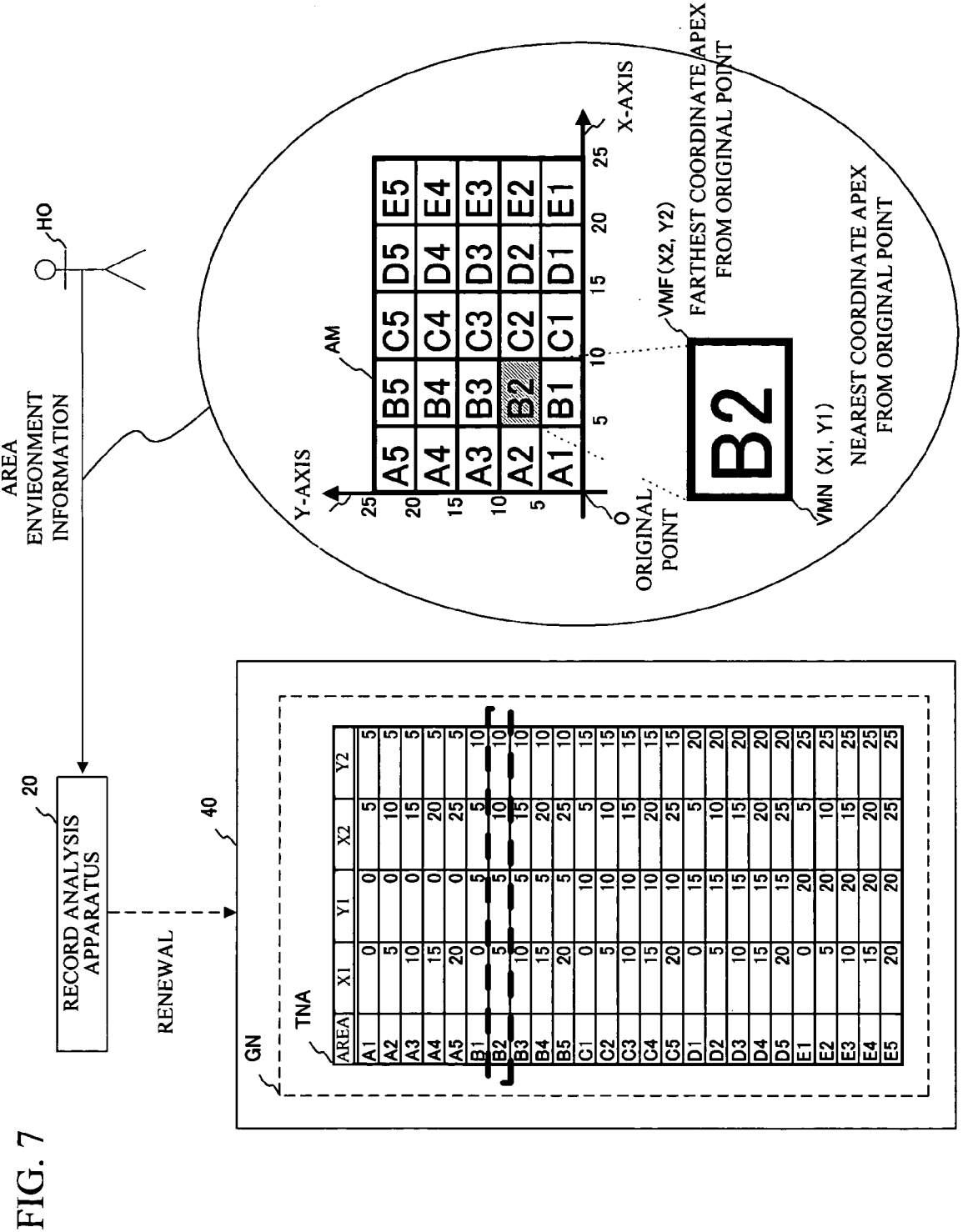
FIG. 7 is a view exemplarily showing a relationship between the record analysis apparatus and an area environment table.

Referring now to FIG. 7, a description will be given of the environment information relating to the divided areas of the conference room. FIG. 7 is a view exemplarily showing a relationship between the record analysis apparatus 20 and an area environment table. A conference room AM is divided into areas that are not overlapped by each other. The divided area is represented by a two-dimensional coordinate with a specific position in the conference room serving as an original point. In accordance with the present embodiment of the present invention, the divided area is square-shaped. Therefore, the divided area is specified by the two-dimensional coordinate of one apex nearest to the original point and the other apex farthest from the original point.

The operator HO inputs the area environment information into the record analysis apparatus 20. The record analysis apparatus 20 stores the information that identifies the divided area in association with the information that identifies the divided area in the conference database 40. The environment information has been input by the operator HO, as described. Here, the information that identifies the divided area corresponds to the area environment information.

Figure 8:
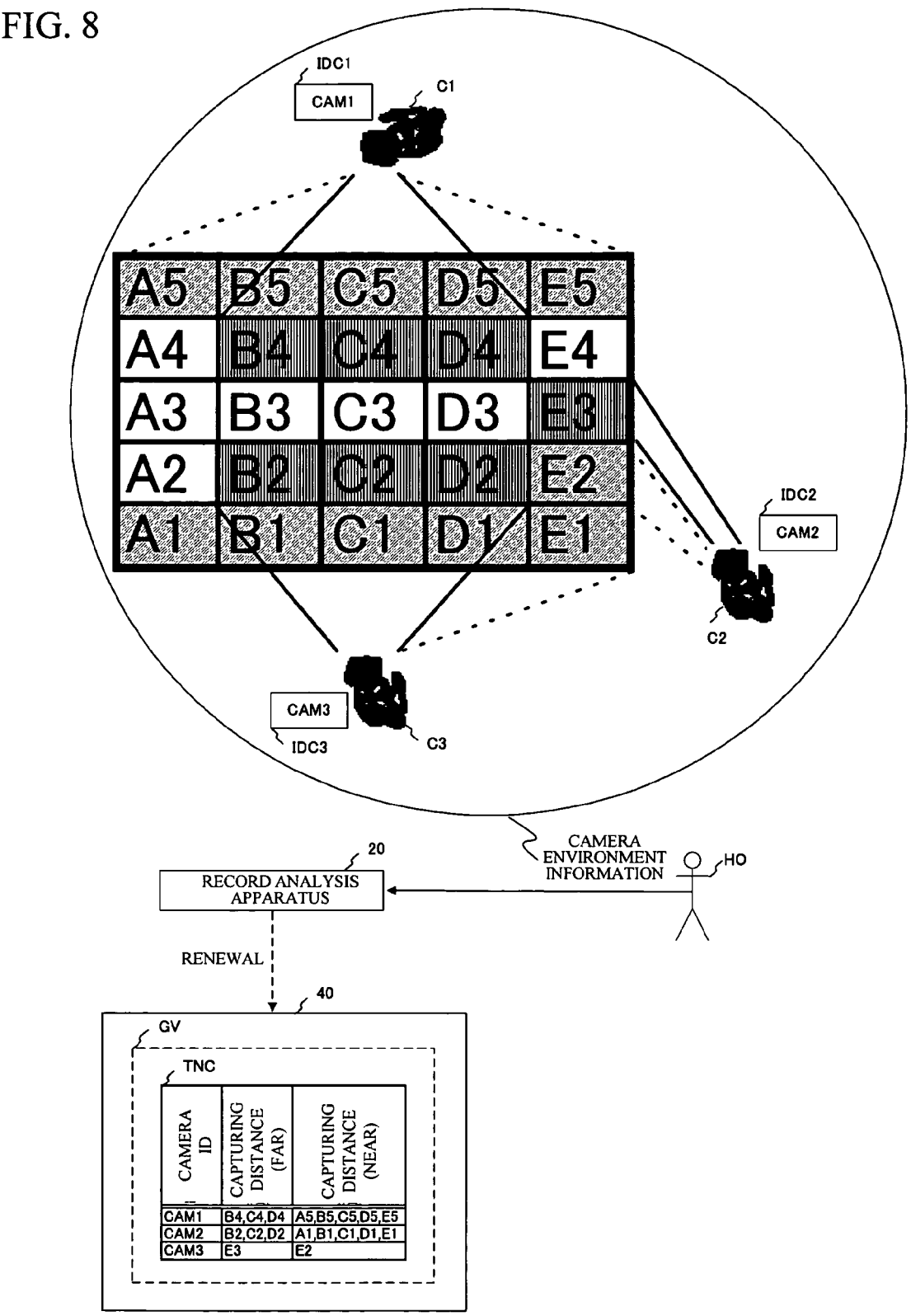
FIG. 8 is a view showing a relationship of the record analysis apparatus and a camera environment table.

Referring now to FIG. 8, a description will be given of the environment information relating to the range captured by the camcorder. FIG. 8 is a view showing a relationship of the record analysis apparatus 20 and a camera environment table. The camcorders C are provided to be capable of capturing different divided areas.

Captured areas are classified into two areas. One is the divided areas positioned within a distance where a sharp image of the person can be captured, and the other is the divided areas positioned within a distance where a sharp image of the person cannot be captured. The record analysis apparatus 20 stores the information that identifies the afore-described two areas in association with the information that identifies the camcorder (hereinafter, referred to as camera ID) in a camera environment table TNC of the conference database 40. The divided areas captured by the camcorder C are represented by the afore-mentioned area environment table.

Figure 9:
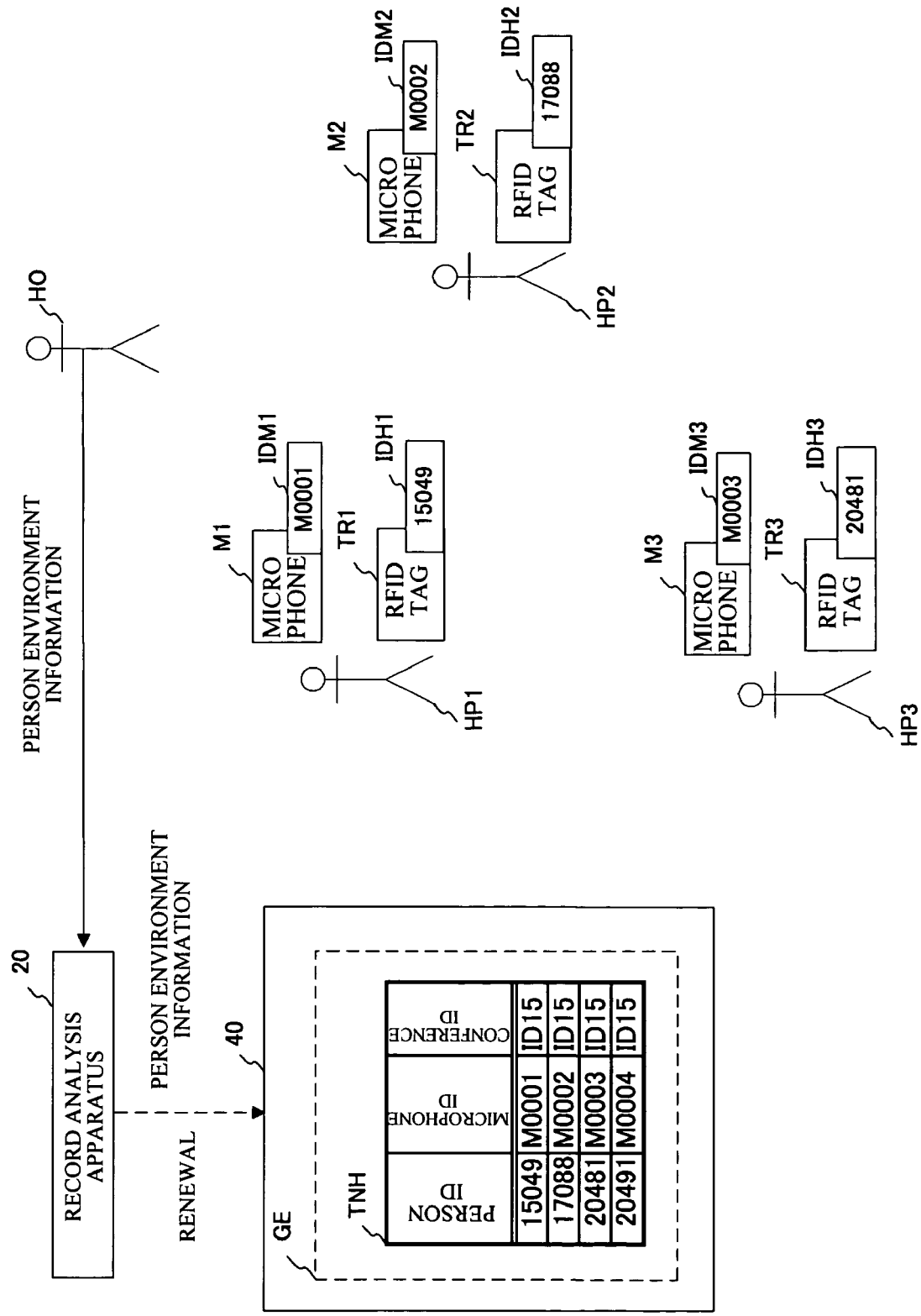
FIG. 9 is a view showing a relationship of the record analysis apparatus and a person environment table.

Referring now to FIG. 9, the environment information relating to the person will be described. FIG. 9 is a view showing a relationship of the record analysis apparatus 20 and a person environment table. The conference participants respectively carry a microphone M and an RFID tag TR, as shown in FIG. 9.

A microphone ID is given to each microphone M, and a person ID is given to each RFID tag. The record analysis apparatus 20 stores the person ID, the conference ID, and the microphone ID, which have been input by the operator HO, in association with one another in a person environment table TNH of the conference database 40.

Figure 10:
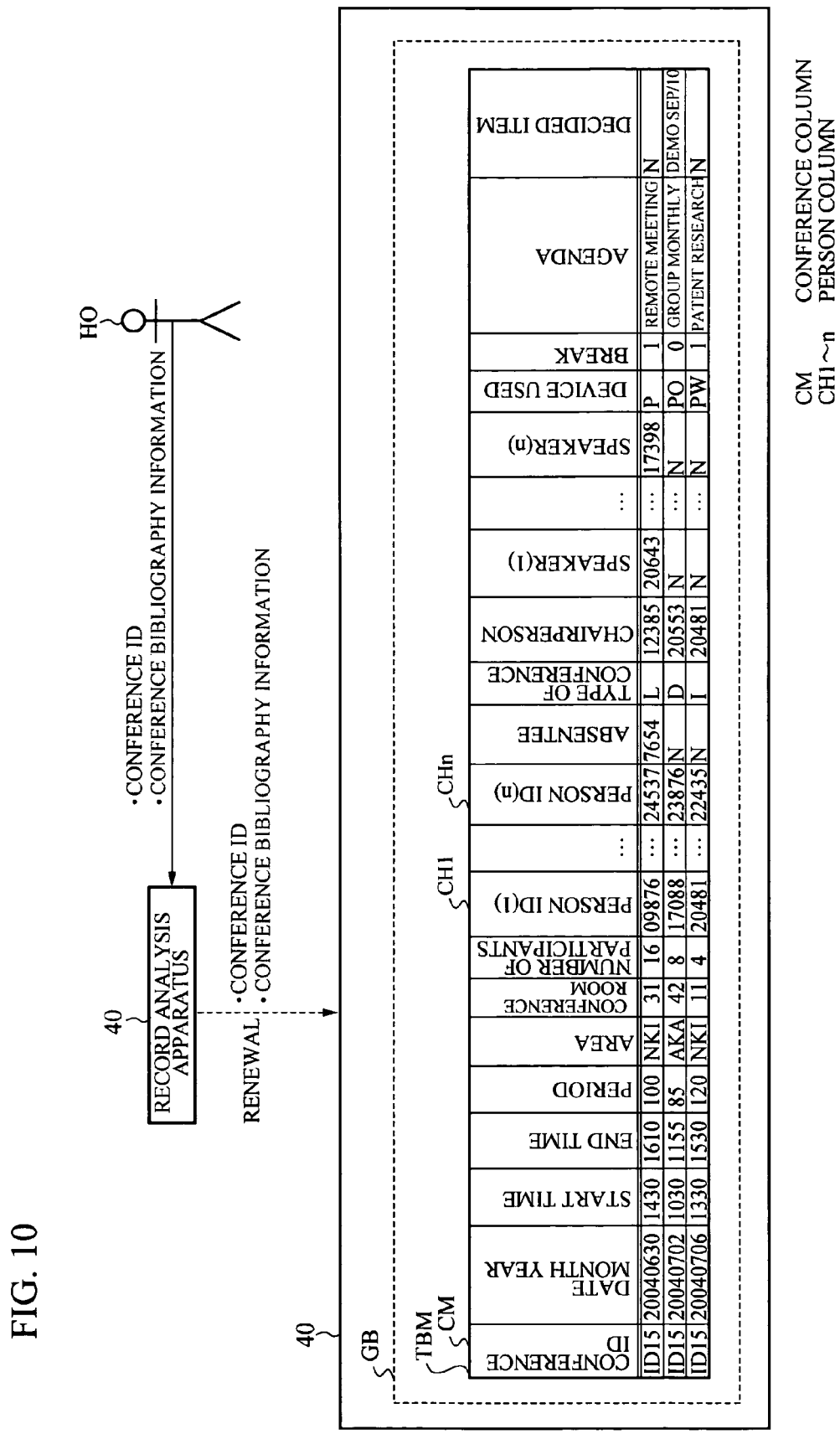
FIG. 10 is a view exemplarily showing conference bibliography information stored in a conference database.

The record analysis apparatus 20 stores conference bibliography information, which has been input by the operator or the like, in a conference bibliography table TBM of the conference database 40. Here, referring now to FIG. 10, the conference bibliography information stored in the conference database 40 will be described. FIG. 10 is a view exemplarily showing the conference bibliography information stored in the conference database 40.

The conference ID and conference bibliography information are input into the record analysis apparatus 20 by the operator HO. Then, the record analysis apparatus 20 stores the conference ID in association with the conference bibliography information in the conference bibliography table TBM of the conference database 40.

The conference bibliography information denotes bibliographic information on the conference. Specifically, the conference bibliography information includes a date-month-year of the conference, start time, end time, area name of the place of the conference, conference room name, number of the participants, person ID of each participant, person ID of absentee, type of conference, person ID of chairperson, person ID of presenter or lecturer, device that was used, with or without a break, start time of the break, end time of the break, agenda, and decided items, and the like. The conference ID is stored in a conference column CM, and the person ID that identifies the conference participant is stored in a person column CH.

The personal database 30 is composed of, for example, a relational database. The personal database 30 is connected to the record analysis apparatus 20 and the information extracting apparatus 50. The personal database 30 stores the personal information of the conference participants.

The conference database 40 is composed of, for example, a relational database. The conference database 40 is connected to the record analysis apparatus 20, the information extracting apparatus 50, and the information retrieval apparatus 80.

Figure 11:
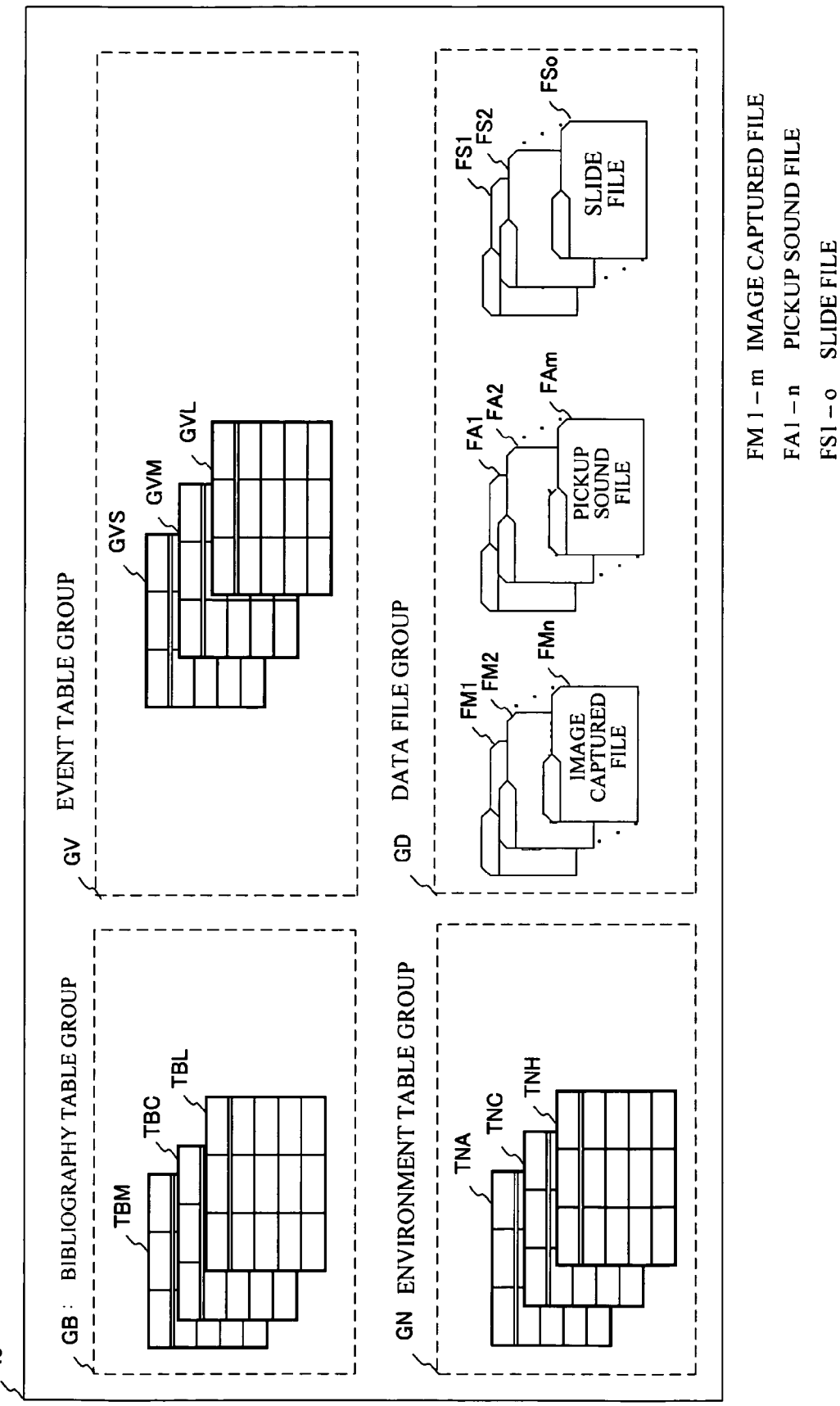
FIG. 11 is a view showing the configuration of the conference database.

Referring now to FIG. 11, a configuration of the conference database 40 will be described. FIG. 11 is a view showing the configuration of the conference database 40. The conference database 40 includes a data table and data file.

The data tables are classified into a bibliography table group GB, an event table group GV, and an environment table group GN. The bibliography table group GB accumulates the bibliographic information, the event table group GV accumulates event information in the conference, and the environment table group GN accumulates the environment information of the present system.

The bibliography table group GB is composed of the conference bibliography table TBM, conference camera table TBC, and conference slide table TBL. The event table group GV is composed of a remark event table GVS, a movement event table GVM, and a slide display event table GVL. The environment table group GN is composed of an area environment table TNA, the camera environment table TNC, and the person environment table TNH. The data file stores a captured-image file FM, a pickup sound file FA, and a slide file FS.

The information extracting apparatus 50 is composed of, for example, a personal computer. The information extracting apparatus 50 is connected to the personal database 30, the conference database 40, and the information database 70.

The information extracting apparatus 50 partially acquires the conference bibliography information of the conference that the system user has attended, the personal information of another participant, and the episodic information thereof. The information extracting apparatus 50 also stores the afore-described information in the information database 70 for each system user.

Here, the episodic information denotes information serving as a cue or keyword, when the system user searches the information, which records the conference that the system user has attended, for the personal information. The information that records the conference, namely, conference record information will be described later. In accordance with the present embodiment of the present invention, as the episodic information, a representative shot, thumbnail, number of conversation times, number of remark times, total conference conversation period, average conference conversation period, total conference remark period, average conference remark period, seat distance in conference, average distance in conference, total number of conversation times, average number of conversation times, total conversation period, average total conversation period, average conversation period, total number of remark times, average number of remark times, total remark period, average total remark period, average remark period, average seat distance, and average distance are acquired. The episodic information will be described later in detail.

The conference record information denotes information, in which the conference that the system user has attended is recorded. In accordance with the present embodiment of the present invention, the conference record information includes the pickup sound, captured image, and the information stored in the remark event table GVS, the movement event table GVM, and the slide display event table GVL.

Figure 12:
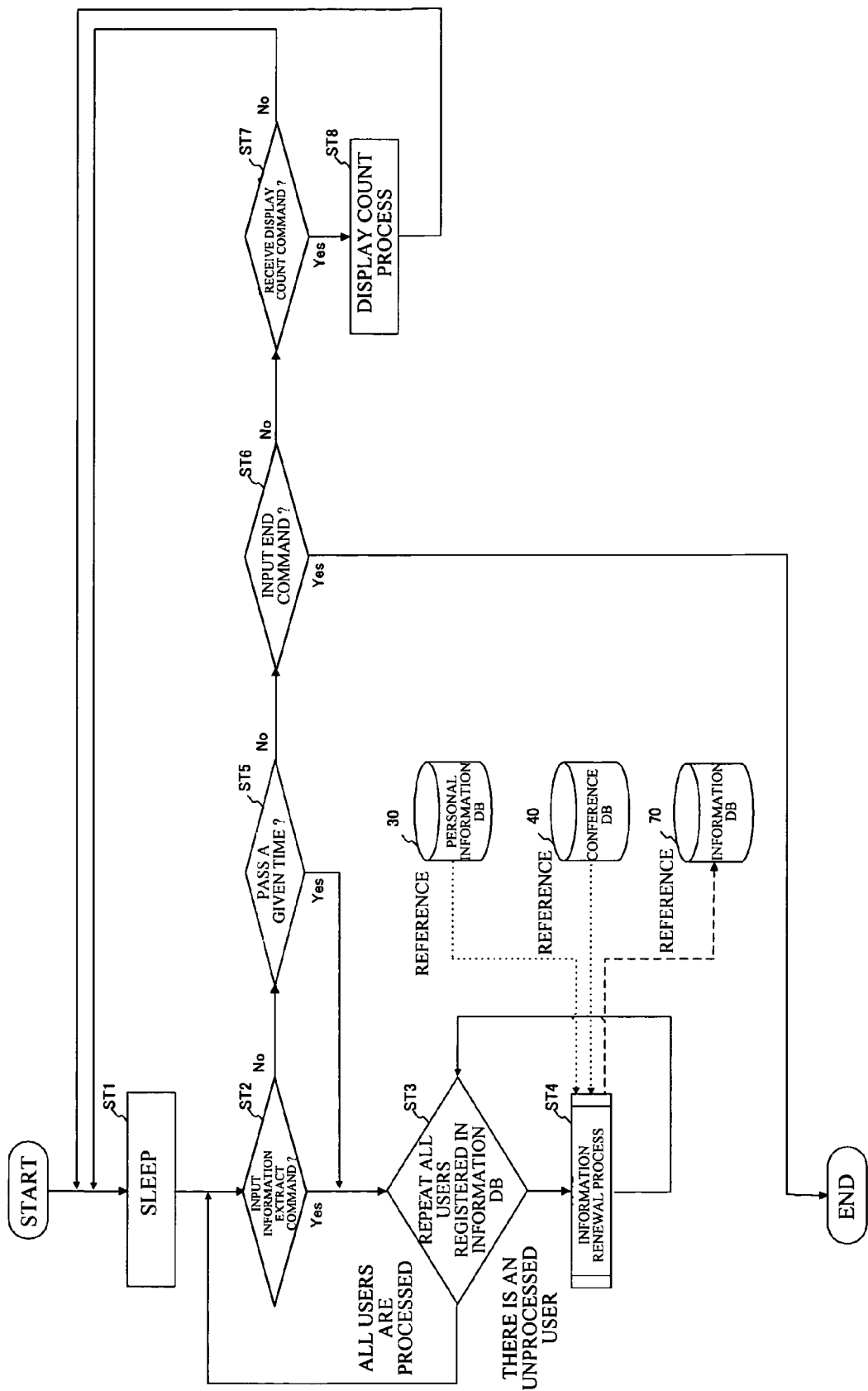
FIG. 12 is a flowchart showing an operation of an image extracting apparatus.
Figure 13:
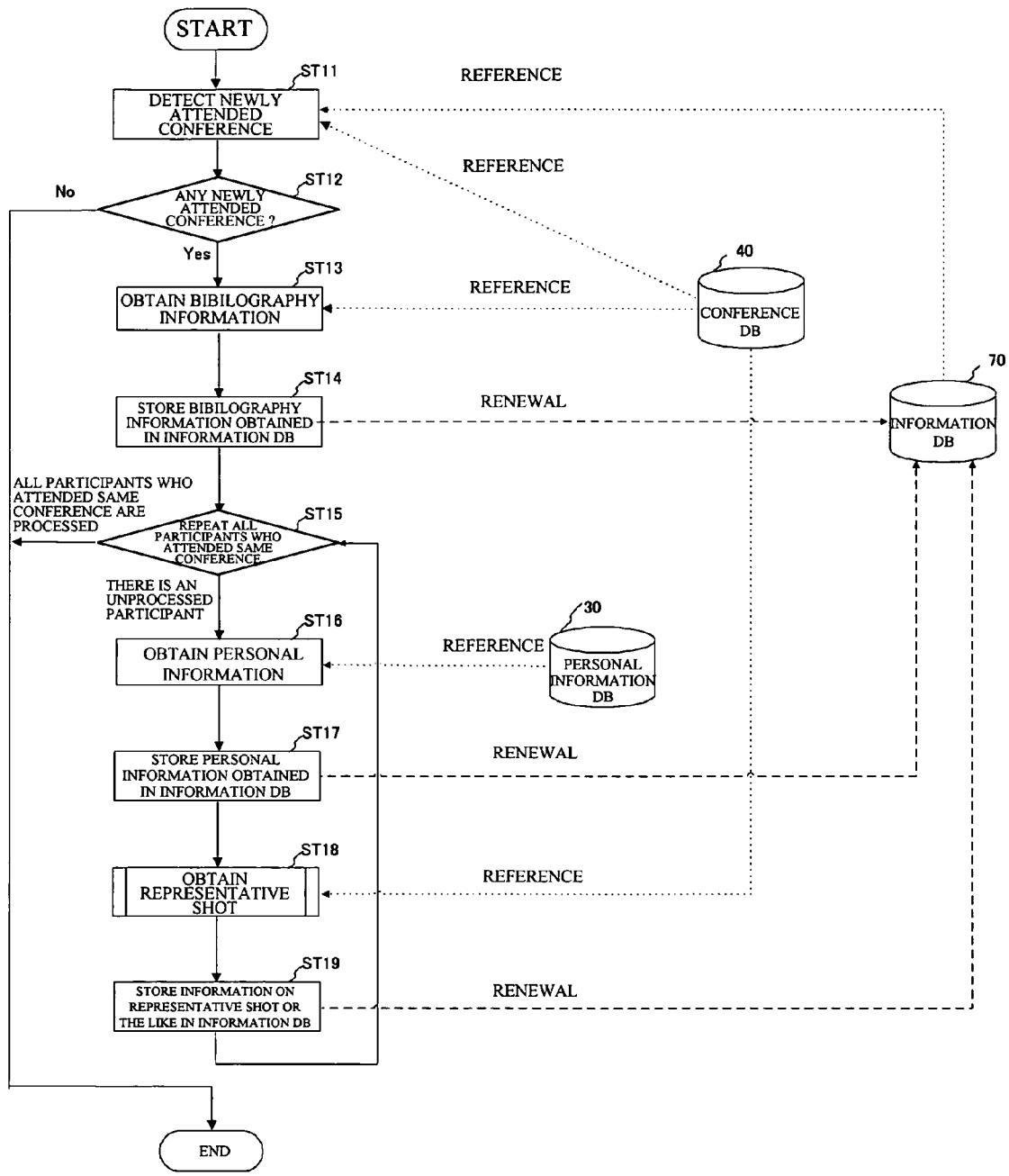
FIG. 13 is a flowchart showing a process that the information extracting apparatus updates user information.
Figure 14:
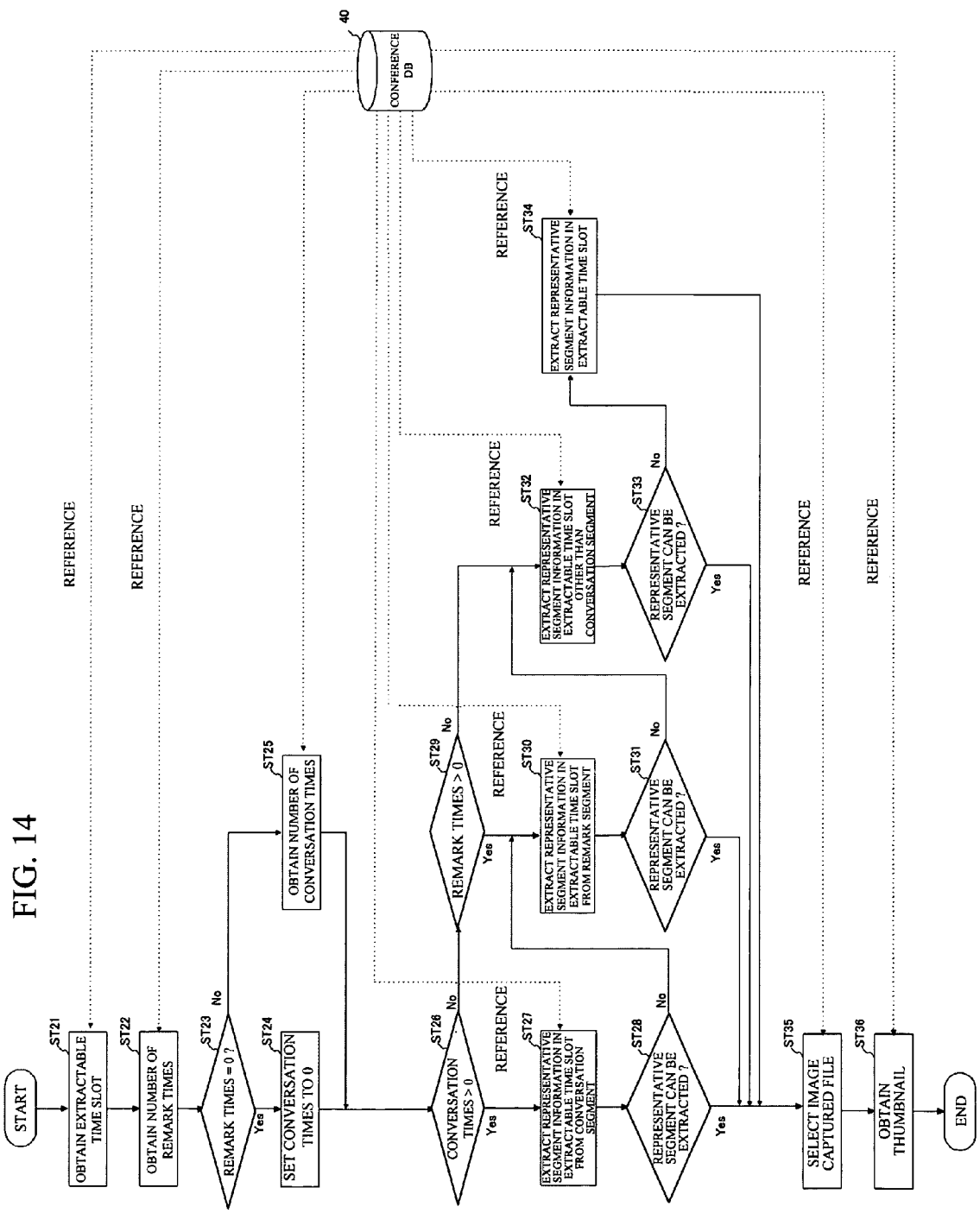
FIG. 14 is a flowchart showing a process that the information extracting apparatus acquires a representative shot.

Now, a description will be given, with reference to FIG. 12 through FIG. 14, of an operation of the information extracting apparatus 50 having the above-described configuration. FIG. 12 is a flowchart showing an operation of the information extracting apparatus 50. FIG. 13 is a flowchart showing a process that the information extracting apparatus 50 updates user information. FIG. 14 is a flowchart showing a process that the information extracting apparatus acquires the representative shot.

First, as shown in FIG. 12, the information extracting apparatus 50 sleeps until a given period passes or until a signal is received (step ST1). Then, the information extracting apparatus 50 determines whether the system user has input an information extract command (step ST2).

This is a process necessary for updating the information database 70 according to the user's arbitrary timing, whereas the information database 70 is updated by implementing a regular batch processing. Then, the information extracting apparatus 50 implements step ST3, if it receives the information extract command. If not, step ST5 is implemented.

At step ST2, the information extracting apparatus 50 sequentially checks whether the process at step ST4 has been implemented on all system users registered in the information database 70, if it determines that the received command is the information extract command (step ST3). The information extracting apparatus 50 implements a process at step ST4, if there is an unprocessed user. If not, processing goes back to step ST1 to repeat the afore-described processes.

At step ST3, if the information extracting apparatus 50 determines that there is an unprocessed user, it implements a user information update process on one of the unprocessed users (hereinafter, referred to as user to be processed) (step ST4). The user information update process will be described later. Subsequently, processing goes back to step ST3 to repeat the afore-described processes.

At step ST2, if the information extracting apparatus 50 determines that the received command is not the information extract command, it determines whether a given time for batch processing has passed (step ST5). This is because the user information update process at step ST4 is implemented on a regular basis. The information extracting apparatus 50 implements the process at step ST3 if the given time has passed. If not, it implements a process at step ST6.

At step ST5, if the information extracting apparatus 50 determines that the given time has not passed, it determines whether the system user has input an end command (step ST6). The information extracting apparatus 50 completes a process if the end command has been input. If not, it implements a process of step ST7.

At step ST6, if the information extracting apparatus 50 determines that the end command has not been received, it determines whether a display count command has been received (step ST7). The information extracting apparatus 50 implements a process of step ST8, if the display count command has been input. If not, processing goes back to step ST1 to repeat the afore-described processes.

At step ST7, if the information extracting apparatus 50 determines the display count command has been received, it implements a display count process. Then, processing goes back to step ST1 to repeat the afore-described processes.

Now, the display count process will be described. The display count process is a count process to be implemented by the information extracting apparatus 50 to facilitate a search process of the information retrieval apparatus 80. First, the information extracting apparatus 50 refers to the information stored in the conference database 40 and the information database 70, and counts various conference indexes specified in the display count command and an overall index except for a forgetting level. The conference index, overall index, and forgetting level will be described later.

Subsequently, the information extracting apparatus 50 stores the various indexes, which are counted results, in the information database 70. When accumulation of the indexes is completed, the information extracting apparatus 50 sends a count completion notification to the information retrieval apparatus 80.

Here, the conference indexes include the seat distance in conference, average distance in conference, total conference conversation period, average conference conversation period, total conference remark period, and average conference remark period. The conference indexes are counted and stored by the information extracting apparatus 50, for each conference participant of the processed conference.

The overall index includes a number of times attend same conference, rate of attending same conference, total period attend same conference, rate of attending same conference per time, average seat distance in conference, average distance, total number of conversation times, average number of conversation times, total conversation period, average total conversation period, average conversation period, total number of remark times, average number of remark times, total remark period, average total remark period, average remark period, conference ID attend same conference first time, conference ID attend same conference last time, and forgetting level. The overall index except the forgetting level is counted and stored by the information extracting apparatus 50 for each participant of the processed conference.

In accordance with the present embodiment of the present invention, the information extracting apparatus 50 counts the conference indexes as the episodic information, the conference indexes being the seat distance in conference, average distance in conference, total conference conversation period, average conference conversation period, total conference remark period, and average conference remark period. In addition, the information extracting apparatus 50 also counts, as the overall index, the average seat distance in conference, average distance, total number of conversation times, average number of conversation times, total conversation period, average total conversation period, average conversation period, total number of remark times, average number of remark times, total remark period, average total remark period, and average remark period. With this configuration, the episodic information is automatically acquired, thereby eliminating the efforts of the system administrator or the like.

A description will now be given of the conference index. The seat distance in conference denotes a distance between a seat area of the system user and another seat area of the conference participant in the processed conference. The seat area denotes an area where the participant spent the longest time in the conference.

The seat area is obtained by counting the movement event table TVM of the conference database 40. The distance between the seat areas is calculated by obtaining center coordinates of the respective seat areas from the area environment table TNA of the conference database 40.

The average distance in conference denotes an average in distance between an area where the system user is existent and another area where the conference participant is existent in the processed conference. The total conference conversation period denotes a total time of conversation between the system user and the conference participant. The average conference conversation period denotes an average time of conversation between the system user and the conference participant in the processed conference. In other words, the average conference conversation period denotes how long the system user converses with the conference participant on an average. The total conference remark period denotes a total of the remark period of the conference participant in the processed conference. The average conference remark period denotes an average of the remark period of the conference participant in the processed conference.

A description will now be given of the overall index. The number of times attend same conference denotes a how many times the system user and the participant attended the processed conference. The rate of attending same conference denotes a rate that the system user and the participant attended the processed conference, and is obtainable by dividing the number of times attend same conference by the number of the processed conferences that the system user attended. The total period attend same conference denotes a total time of the processed conference that the system user and another participant attended. The rate of attending same conference per time is obtainable by dividing the total period attend same conference by a total time of the processed conference that the system user attended.

The average seat distance in conference denotes an overall average of the seat distance in conference. The average distance denotes an overall average of the average distance in conference. The total number of conversation times denotes a total of the number of conversation times. The average number of conversation times denotes an overall average of the number of the conversation times. The total conversation period denotes a total of the total conference conversation period. The average total conversation period denotes an overall average of the total conference conversation period. The average conversation period denotes an overall average of the average conference conversation period.

The total number of remark times denotes a total of the remark times. The average number of remark times denotes an overall average of the remark times. The total remark period denotes a total of the total conference remark period. The average total remark period denotes an overall average of the total conference remark period. The average remark period denotes an overall average of the average conference remark period.

The conference ID attend same conference first time denotes a conference ID of the processed conference that the system user and the participant attended for the first time. The conference ID attend same conference last time denotes a conference ID of the processed conference that the system user and the participant attended last time. The forgetting level is specified by the forgetting level determination apparatus 60, and represents a level that the system user forgets the personal information of the participant.

Referring now to FIG. 13, a description will be given of the user information update process to be implemented by the information extracting apparatus 50. The information extracting apparatus 50 detects a conference that the user to be processed attended but the user information update process is not processed yet (hereinafter, referred to as a newly attended conference) (step ST11). The detection process will be described hereafter.

First, the information extracting apparatus 50 refers to the information that identifies the user to be processed (hereinafter, referred to as user ID to be processed) in the information database 70. Then, the information extracting apparatus 50 acquires from the information database 70, the information (hereinafter, referred to as processed conference ID) that identifies the conference stored (hereinafter, referred to as processed conference) as a result of the user information update process, as a conference that the user to be processed attended.

Then, the information extracting apparatus 50 searches the conference bibliography table TBM of the conference database 40 for a record, on the condition that the user ID to be processed is accumulated in the person column CH and the processed conference ID is not accumulated in the conference column CM. This allows the information extracting apparatus 50 to obtain the conference ID to be accumulated in the conference column CM of the searched record. The conference that is identified by such obtained conference ID corresponds to the newly attended conference.

Then, at step ST12, the information extracting apparatus 50 determines whether the newly attended conference has been detected in the detection process at step S11. The information extracting apparatus 50 implements a process at step S13, if it has detected the newly attended conference. If not, processing completes.

If the newly attended conference has been detected at step ST12, the information extracting apparatus 50 acquires the conference bibliography information relating to the newly attended conference (step ST13). In order to acquire the conference bibliography information, the system user may refer to a record having a newly attended conference ID stored in the conference bibliography table TBM of the conference database 40.

Then, the information extracting apparatus 50 adds the conference bibliography information obtained at step ST13 to the information database 70 in association with the newly attended conference ID and the user ID to be processed.

Basically, the information extracting apparatus 50 has to add only the newly attended conference ID to the information database 70. However, in the information system, it is possible to maintain consistency of the conference bibliography information by associating the conference ID stored in the information database 70 and the conference ID stored in the conference bibliography table TBM of the conference database 40.

Nevertheless, the information system has to shorten a period for search process. The conference bibliography information is not likely to be updated in the present information system. Accordingly, the configuration is employed in such a manner that data is duplicated in accordance with the present embodiment of the present invention.

The information extracting apparatus 50 determines whether processes of step ST16 through step ST19 have been implemented on each participant of the newly attended conference (step ST15). If there is a participant in the newly attended conference that step 16 through step 19 are not implemented (hereinafter, referred to as unprocessed participant), a process at step ST16 is implemented for the unprocessed participant. If not, processing completes.

At step ST15, if the information extracting apparatus 50 determines that there is an unprocessed participant, it acquires the personal information of the unprocessed participant (step ST16). Here, the personal information is obtainable when the information extracting apparatus 50 searches the personal information table TID of the personal database 30, on the basis of the person ID of the unprocessed participant.

Then, the information extracting apparatus 50 adds the personal information of the unprocessed participant to the information database 70 in association with the newly attended conference ID and the user ID to be processed (step ST17).

With the afore-mentioned configuration, it is impossible to maintain consistency between the personal information stored in the personal database 30 and the personal information of the conference participant stored in the information database 70, because the personal information is stored. That is to say, the personal information accumulated in the personal database 30 is updated to be the latest one by the record analysis apparatus 20, whereas the personal information of the conference participant accumulated in the information database 70 maintains the personal information stored in the personal database 30 even after the user information update process is performed.

This is because, for example, the system is configured in such a manner that the system user is able to search for the personal information on the basis of a family name of a participant when the participant was introduced at the conference, if the participant has changed his or her family name after the marriage or the like and the system user does not know the fact.

Then, the information extracting apparatus 50 implements a process of acquiring a representative shot of the unprocessed participant (step ST18), as will be described layer together with a definition of the representative shot.

The information extracting apparatus 50 stores the information on the representative shot or the like acquired in the information database 70 in association with the user ID to be processed, the conference ID of the newly attended conference, and the person ID of the unprocessed participant (step ST19).

The information on the representative shot or the like denotes the number of conversation times converse with the participant to be processed, number of remark times, information on the representative shot, and thumbnail thereof, which have been obtained by the process of acquiring a representative shot. The information on the representative shot will be described later. Subsequently, the information extracting apparatus 50 goes back to the process at step ST15 to repeat the afore-described processes.

Referring now to FIG. 14, a description will be given of the process of acquiring the representative shot to be implemented by the information extracting apparatus 50. The information extracting apparatus 50 acquires a time slot from which the representative shot can be extracted (hereinafter, referred to as extractable time slot) in the captured image of the conference (step ST21).

In accordance with the present embodiment of the present invention, the extractable time slot is determined whether the time slot satisfies following conditions. In the time slot, the participant to be processed is positioned in an area that can be captured by a camcorder. Also, in the time slot, no slide is being displayed.

Here, the condition that no slide is being displayed is added, because the room is dim or dark and the imaged captured by the camcorder is not clear or sharp in the time slot while the slide is being displayed.

Next, a description will be given of a method of acquiring the extractable time slot. First, the area that can be captured by the camcorder C is obtained from the camera environment table TNC of the conference database 40. Then, the positional information of the participant to be processed and the related time slot are acquired from the movement event table GVM of the conference database 40. In this manner, it is possible to obtain the time slot when the participant to be processed was positioned in the area where the image thereof can be captured.

It is also possible to acquire the extractable time slot by acquiring the time slot where the slide was being displayed from the slide display event table GVL of the conference database 40. If the extractable time slot cannot be obtained because the slide was always displayed in the conference, the extractable time slot is made to correspond to the time slot while the conference was being held.

The information extracting apparatus 50 obtains the number of remark times of the participant to be processed (step ST22). In order to obtain the number of remark times, the microphone ID of the microphone M, which was used by the person that is identified by the participant ID to be processed, is obtained from the person environment table TNH of the conference database 40. Then, the information extracting apparatus 50 acquires a record in which the microphone ID and the newly attended conference ID are stored, from the remark event table TVS in the conference database 40.

The number of the records obtained in this manner corresponds to the number of the remark segments, namely, the number of remarks. With the afore-described configuration, the episodic information is automatically obtainable, enabling to eliminate the labor of the system administrator.

Subsequently, the information extracting apparatus 50 determines whether or not the participant to be processed made a remark in the newly attended conference (step ST23). This can be determined whether or not the number of remarks is 0. If the number of remarks is 0, a process at step ST24 is implemented. If not, a process at step ST25 is implemented.

At step ST23, if the information extracting apparatus 50 determines that the number of remarks is 0, set the number of conversation times to 0 (step ST24). This is because when the participant to be processed does not make a remark, which means that the participant to be processed does not converse with the user to be processed. With the afore-described configuration, the episodic information is automatically obtainable, enabling to eliminate the labor of the system administrator. Then, the information extracting apparatus 50 implements step ST26.

At step ST23, if the information extracting apparatus 50 determines that the number of remarks is not 0, the information extracting apparatus 50 obtains the number of conversation times between the user to be processed and the participant to be processed (step ST25).

Figure 15:
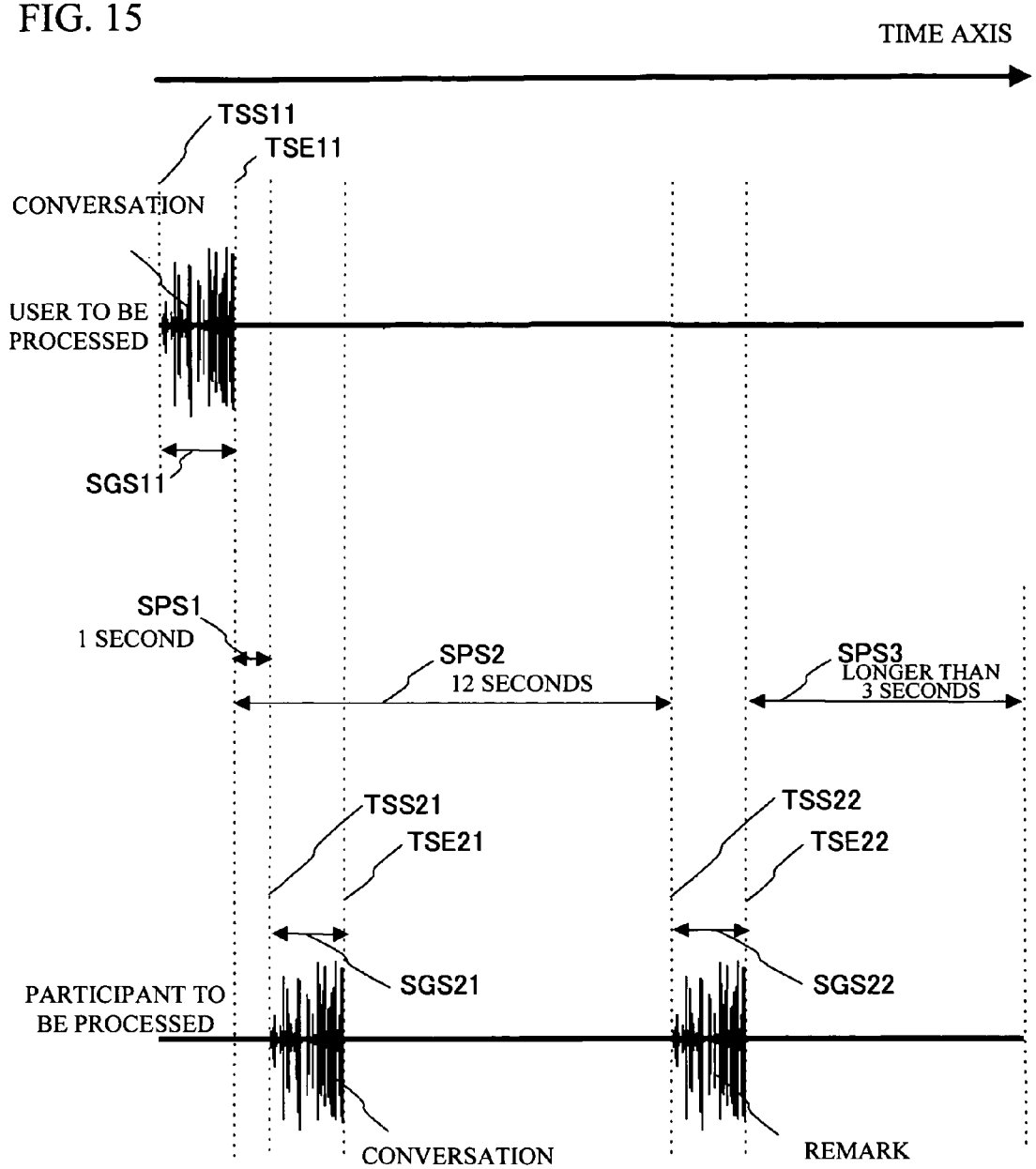
FIG. 15 is a view showing the remark segment between the user to be processed and the participant to be processed on the basis of a time relationship.

A description will be given, with reference to FIG. 15, of a method of obtaining the number of conversation times between the user to be processed and the participant to be processed. FIG. 15 is a view showing the remark segment between the user to be processed and the participant to be processed on the basis of a time relationship.

The information extracting apparatus 50, as shown in FIG. 15, obtains a segment time interval SPS from a remark segment end time TSE of the user to be processed to a remark segment start time of the participant to be processed TSS, or obtains the segment time interval SPS from the remark segment end time TSE of the participant to be processed to the remark segment start time of the user to be processed TSS. If the segment time interval SPS does not exceed a predetermined threshold value, it is determined as a conversation. If not, it is determined as a remark.

Here, in accordance with the present embodiment of the present invention, a description will be given with the threshold value set to 3 seconds. In FIG. 15, a segment time interval SPS1 between a remark segment SGS11 of the user to be processed and a remark segment SGS21 of the participant to be processed is 1 second. Therefore, it is determined that the user to be processed and the participant to be processed made a conversation. The remark segment that is determined as conversation is especially referred to as conversation segment.

On the other hand, in FIG. 15, a segment time interval SPS2 between a remark segment SGS22 of the participant to be processed and a remark segment SGS11 of the user to be processed is 12 seconds, and this exceeds the threshold value of 3 seconds. Therefore, it is determined that the remark segment SGS11 and the remark segment SGS22 are not determined conversation.

In addition, there is no remark segment SGS of the user to be processed that satisfies the threshold value of 3 seconds or less in the segment time interval SPS3 defined by the remark segment SGS22 of the participant to be processed. Therefore, it is determined that the remark segment SGS22 of the participant to be processed is not a remark segment.

In order to acquire the remark segment start time TSS and the remark segment end time TSE of the user to be processed or the participant to be processed, the remark event table GVS and a person environment table GNH in the conference database 40 maybe associated with the microphone ID and the conference ID. With the afore-described configuration, the episodic information is automatically obtainable, thereby enabling to eliminate the labor of the system administrator.

The information extracting apparatus 50 determines whether the user to be processed conversed with the participant to be processed in the newly attended conference. This is determined by whether the number of conversation times is greater than 0 (step ST26). If the number of conversation times is greater than 0, the information extracting apparatus 50 implements step ST27. If not, the information extracting apparatus 50 implements step ST29.

At step ST26, if the information extracting apparatus 50 determines that the number of conversation times is greater than 0, information on a representative segment (hereinafter, referred to as representative segment) that is included in the extractable time slot out of the conversation segments (step ST27).

The representative segment denotes a segment having a longest segment length out of the segments to be extracted. However, if the length of the representative segment exceeds a predetermined threshold value, the representative segment is to be extracted continuously from the start time so that the segment length may correspond to the predetermined threshold value.

The information extracting apparatus 50 determines whether the represent segment information has been extracted (step ST28). If the information extracting apparatus 50 can extract the representative segment information, the information extracting apparatus 50 implements a process at step ST35. If not, the information extracting apparatus 50 implements a process at step ST30.

There is another case where the information extracting apparatus 50 cannot extract the representative segment information. This means that, for example, the user to be processed conversed with the participant to be processed and a slide was being displayed during the conversation all the time. In this case, the representative segment is extracted from the remark segments, as will be described hereafter.

Referring to FIG. 14 again, if it is determined that the number of conversation times is greater than 0 at step ST26, the information extracting apparatus 50 further determines whether the number of remark times is greater than 0 (step ST29). The information extracting apparatus 50 implements a process at step ST30. If not, the information extracting apparatus 50 implements a process at step ST32.

At step ST28, it is determined that the information extracting apparatus 50 cannot extract the representative segment information from the conversation segment, or if the information extracting apparatus 50 determines that the number of conversation times of the participant to be processed is greater than 0, the representative segment that is included in the extractable time slot is extracted from the remark segment of the participant to be processed (step ST30).

Then, the information extracting apparatus 50 determines whether the representative segment information can be extracted (step ST31). If the information extracting apparatus 50 can extract the representative segment information, the information extracting apparatus 50 implements a process at step 35. If not, the information extracting apparatus 50 implements a process at step 32.

At step ST31, if it is determined that the information extracting apparatus 50 cannot extract the representative segment from the remark segment, the information extracting apparatus 50 acquires the representative segment that is included in the extractable time slot from the segment in which no participant included in the newly attended conference makes a remark (step ST32).

The information extracting apparatus 50 determines whether the representative segment information has been extracted (step ST33). If the information extracting apparatus 50 can extract the representative segment information, the information extracting apparatus 50 implements a process at step ST35. If not, the information extracting apparatus 50 implements a process at step ST34.

At step ST33, if it is determined that the information extracting apparatus 50 cannot extract the representative segment information, the representative segment information is extracted from the extractable time slot (step ST34). Subsequently, the information extracting apparatus 50 implements a process at step ST35.

The information extracting apparatus 50 determines that the representative segment information can be extracted at step ST28, ST31, and ST33, or after the representative segment information is extracted at step ST34, the image file having the sharpest image of the participant is selected from the image files that include the captured images of the participants (step ST35).

A description will be given of a process of selecting a captured-image file. First, the information extracting apparatus 50 refers to the movement event table TVM in the conference database 40 to acquire the positional information of the participant in the representative segment.

Then, the information extracting apparatus 50 refers to the camera environment table in the conference database 40 to acquire the camera ID of the camera or camcorder that captures the participant the sharpest from the positional information acquired. If multiple camcorders are used to capture the participant to be processed, the information extracting apparatus 50 determines that the camcorder arranged closest to the participant captures the image of the participant clearly or sharply.

The information extracting apparatus 50 refers to the conference camera table TBC of the conference database 40 to obtain an image file ID having the conference ID and camera ID by searching with the newly attended conference ID and the camera ID obtained, as described above.

In this manner, it is possible to acquire a captured image of the participant in the representative segment (hereinafter, referred to as representative shot image). In the same manner, it is possible to acquire the pickup sound of the participant in the representative segment (hereinafter, referred to as representative shot sound). A representative shot denotes both the representative shot image and the representative shot sound. With this configuration, the episodic information is automatically acquired, thereby eliminating the labor of the system administrator or the like.

Representative shot information denotes information that represents where the captured-image file and pickup sound file selected by the start time and end time of the representative segment are stored. The representative shot information is stored in the information database 70, instead of the representative shot itself. This configuration is employed so that the disk capacity can be saved in the information database 70 and a user information update process may be accelerated.

The representative shot image, which is extracted from the captured image by the representative segment obtained from the conversation segment, is referred to as conversation image, and the representative shot sound, which is extracted from the pickup sound by the representative segment obtained from the conversation segment, is referred to as conversation sound. In the same manner, the representative shot sound, which is extracted from the captured image by the representative segment obtained from the remark segment, is referred to as remark image, and the representative shot sound, which is extracted from the pickup sound by the representative segment obtained from the remark segment, is referred to as remark sound.

The information extracting apparatus 50 obtains the thumbnail of the participant to be processed (step ST36). This is obtainable by acquiring an initial frame of the representative shot image obtained at step ST35 and reducing the initial frame. Then, the information extracting apparatus 50 completes the process of acquiring the representative shot.

With this configuration, it is possible to eliminate the labor of the system administrator that obtains the representative shot and reduce the psychological resistance of the conference participant whose images and voices are captured and picked up.

The forgetting level determination apparatus 60 is composed of, for example, a personal computer. The forgetting level determination apparatus 60 is connected to the information database 70. The forgetting level determination apparatus 60 is connected to a speaker, pointing device (hereinafter, simply referred to as mouse), and keyboard, which are not shown.

The forgetting level determination apparatus 60 specifies a forgetting level of the system user with respect to the participant of the processed conference, who the system user met before. The forgetting level determination apparatus 60 stores the forgetting level in the information database 70. Here, the forgetting level denotes a level that the system user has forgotten the personal information of the participant.

Specifically, the forgetting level determination apparatus 60 acquires the thumbnail or representative shot, which is the episodic information relating to the participant of the processed conference, who the system user has met before.

The forgetting level determination apparatus 60 displays the thumbnail or representative shot image on the display screen, and emits a representative shot sound from the speaker. The user operates a mouse or keyboard to input the personal information such as a name or the like into the forgetting level determination apparatus 60, on the basis of the episodic information being displayed or the sound thereof being emitted.

The forgetting level determination apparatus 60 stores an error in the input of the personal information in association with the person ID of the person whose episodic information is displayed. The forgetting level determination apparatus 60 also specifies the forgetting level for each conference participant on the basis of the error stored.

The forgetting level determination apparatus 60 stores the forgetting level in the information database 70, and stores the information that identifies the system user in association with the person ID of the participant.

The information database 70 is composed of, for example, a relational database. The information database 70 is connected to the information extracting apparatus 50, the forgetting level determination apparatus 60, and the information retrieval apparatus 80.

Figure 16:
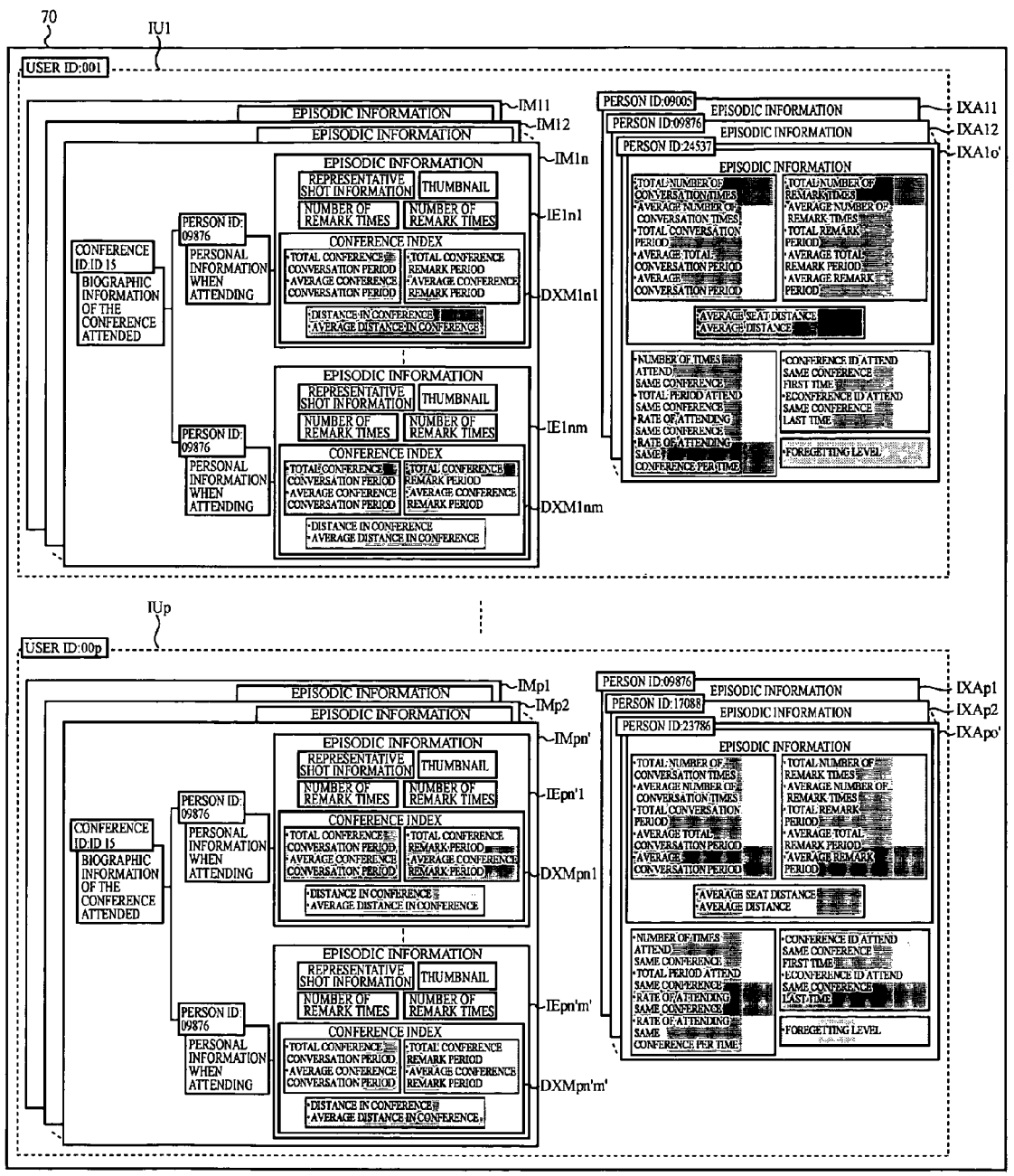
FIG. 16 is a view showing a concept of configuration of the information database.

Referring to FIG. 16, a configuration of the information database 70 will be described. FIG. 16 is a view showing a concept of configuration of the information database 70. The information database 70 stores user information IU for each of the system user of the present system.

The user information IU is composed of conference information IM and an overall index IXA. The conference information IM is composed of the conference bibliography information stored for each processed conference, the personal information of conference participant, and episodic information IE of the conference participant.

The episodic information IE is composed of the representative shot information, thumbnail, number of conversation times, number of remark times, and a conference index IXM. The conference index IXM and overall index IXA is information counted and stored by the information extracting apparatus 50 and the forgetting level determination apparatus 60 to facilitate the search process implemented by the information retrieval apparatus 80. The overall index IXA is stored in the information database 70 for each participant of the processed conference.

The information retrieval apparatus 80 is composed of, for example, a personal computer. The information retrieval apparatus 80 is connected to the information database 70, the information extracting apparatus 50, the display apparatus 90, and the sound emitting apparatus 100.

The information retrieval apparatus 80 is also connected to a mouse and keyboard, not shown. The operator inputs a search condition or display condition into the information retrieval apparatus 80 by manipulating the pointing device or keyboard connected to the information retrieval apparatus 80.

The information retrieval apparatus 80 sends a display count command to the information extracting apparatus 50. When the information retrieval apparatus 80 sends a display count command to the information extracting apparatus 50, the information retrieval apparatus 80 implements a search process after receiving a count end notification from the information extracting apparatus 50. The information retrieval apparatus 80 implements the search process according to the search condition and display condition that have been input.

A specific description of the search process will be described later in detail.

The display apparatus 90 is composed of, for example, a liquid crystal apparatus, CRT, or the like. The display apparatus 90 is connected to the information retrieval apparatus 80. The display apparatus 90 displays a search result implemented by the information retrieval apparatus 80. A specific description of the display process will be given later in detail.

The sound emitting apparatus 100 is composed of, for example, a speaker or the like. The sound emitting apparatus 100 is connected to the information retrieval apparatus 80. The sound emitting apparatus 100 emits a sound of the search result.

Figure 17:
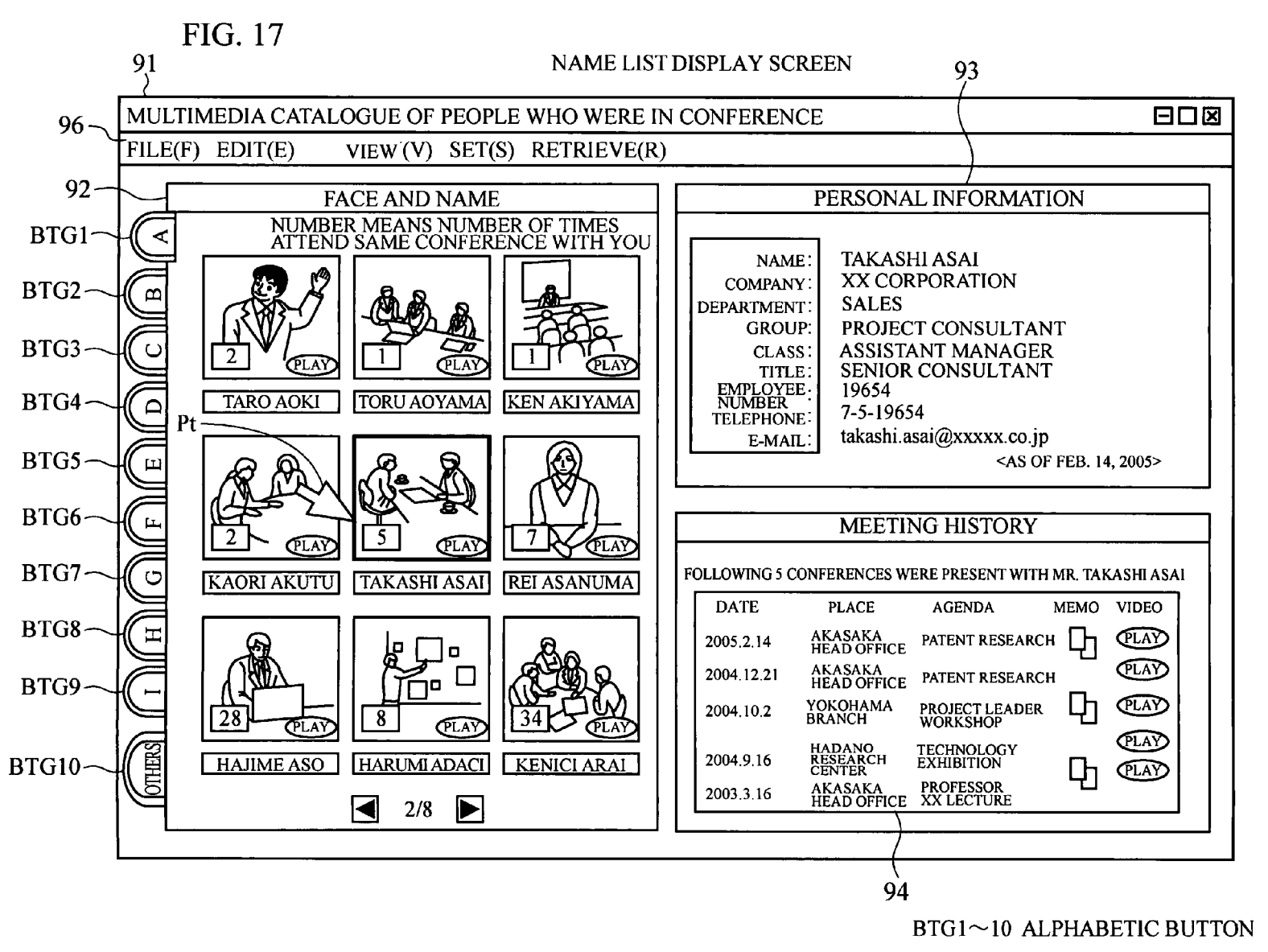
Figure 18:
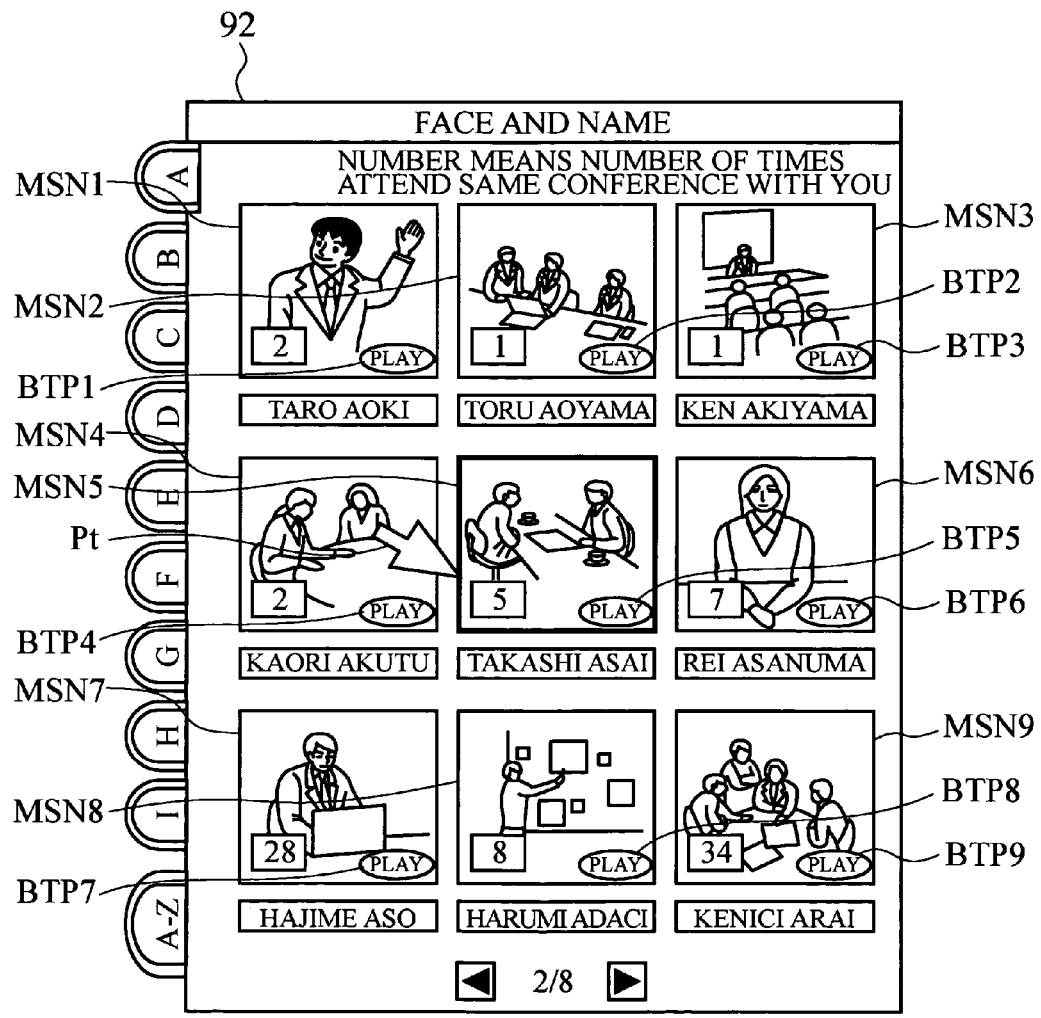
FIG. 18 is a view showing an episodic information display screen on the name list display screen.
Figure 21:
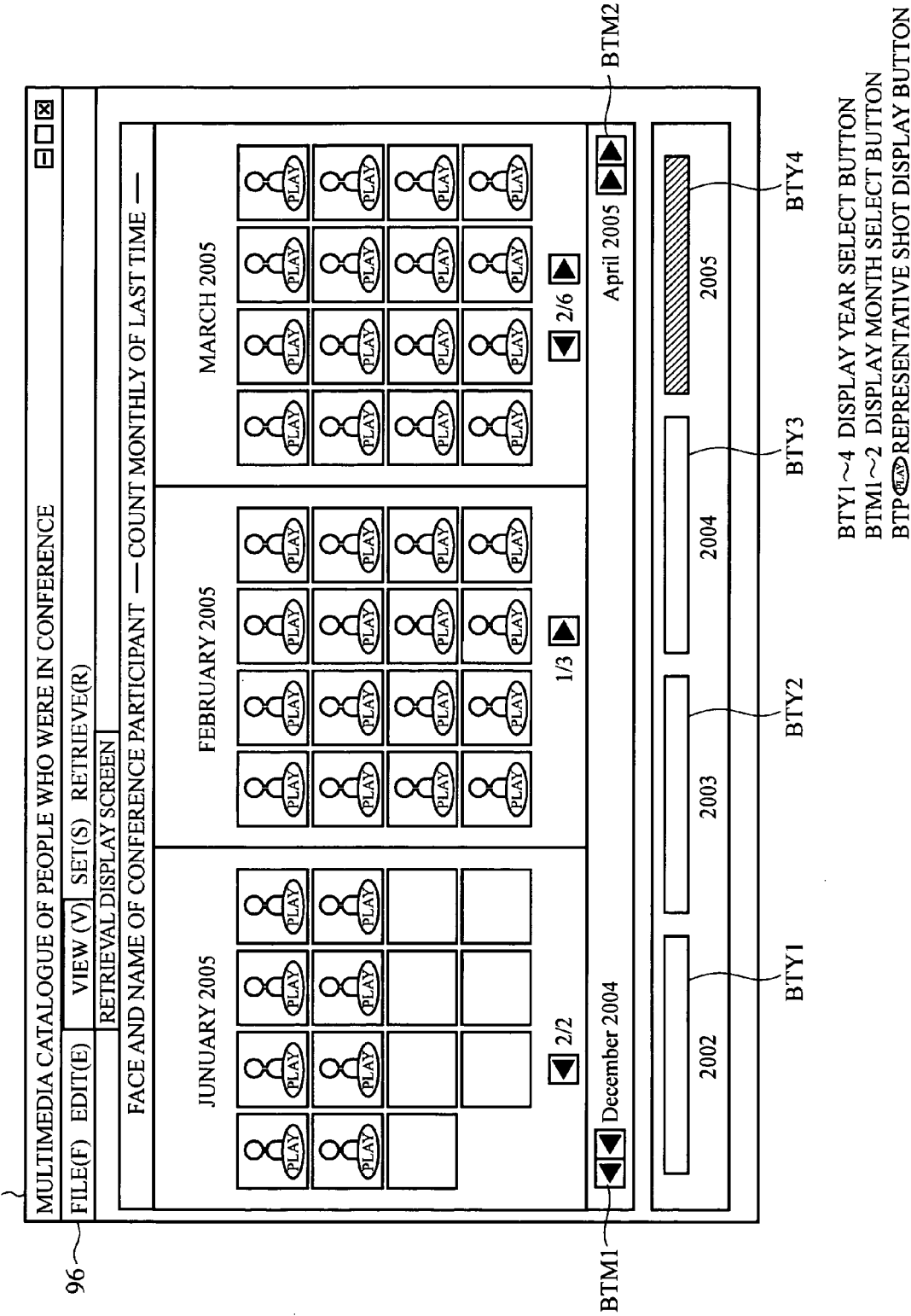
FIG. 21 is a view showing a time-series display screen.
Figure 23:
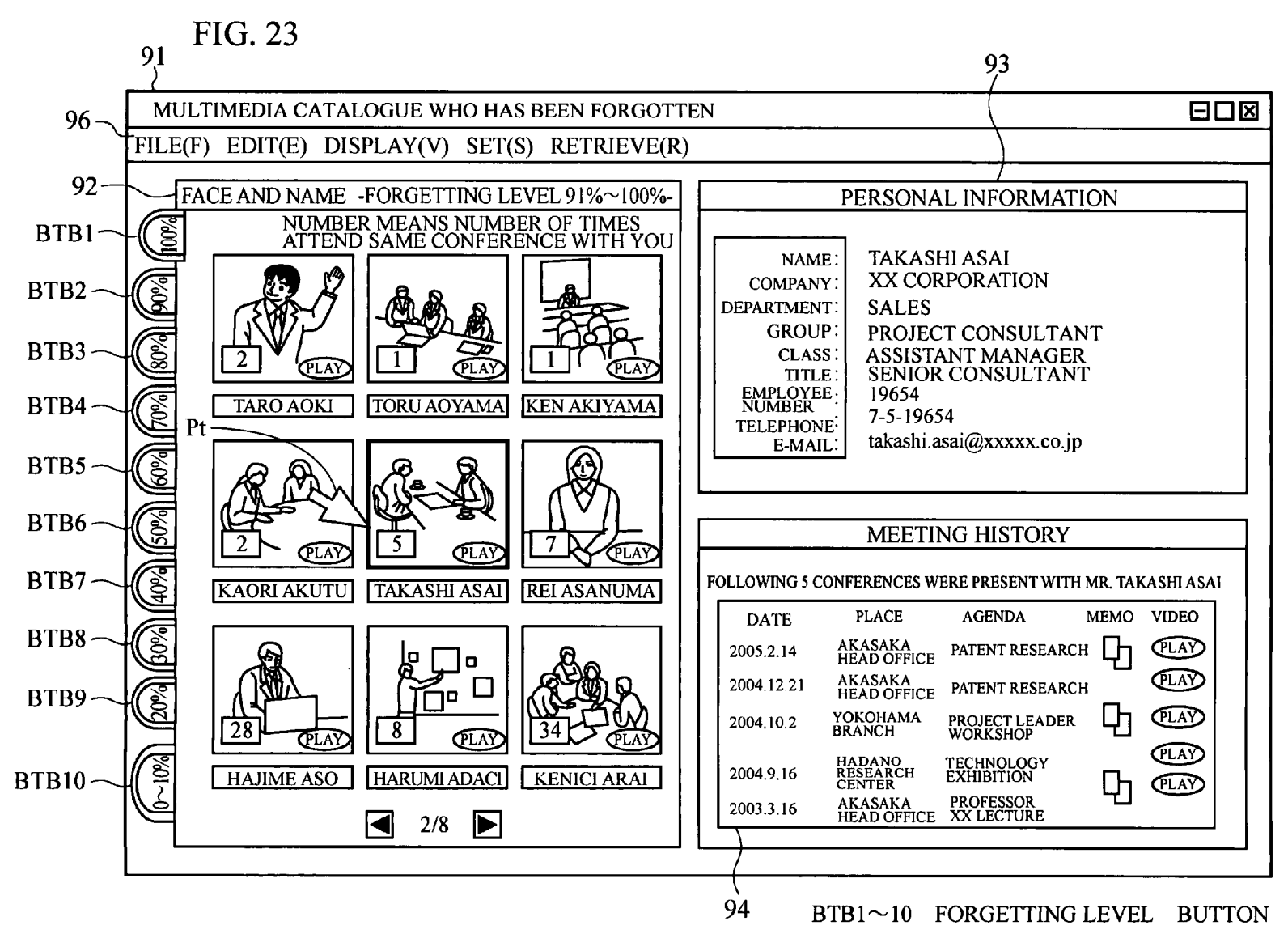

Referring display screens of FIG. 17 through FIG. 21, a description will be given of a search operation of the information retrieval apparatus 80, a display on the display apparatus 90, and a sound of the sound emitting apparatus 100. FIG. 17 is a view showing a screen that displays a name list display screen. FIG. 18 is a view showing an episodic information display screen on the name list display screen. FIG. 19 is a view showing a participant display screen. FIG. 20 is a view showing the episodic information display screen on the participant display screen. FIG. 21 is a view showing a time-series display screen. FIG. 22 is a view showing a search display screen. FIG. 23 is a view showing a forgotten person display screen.

First, a description will be given of a display method or operation method of the initial screen to be displayed, when the system user (hereinafter, simply referred to as user) of the present information system logs in, first. Referring to FIG. 17, an initial screen of a display screen 91 is composed of an episodic information display screen 92, a personal information display screen 93, a conference bibliography information display screen 94, and a menu bar 96.

The episodic information display screen 92 classifies and displays the thumbnails and names to be displayed on the basis of alphabetic order. Here, the display screen 91 being classified and displayed on the basis of alphabetic order is referred to as name list display screen.

Now, a description will be given of a search method of the information retrieval apparatus 80, a display method of the search result to be displayed on the display apparatus 90, and a sound emitting method of the sound emitting apparatus 100. First, the information retrieval apparatus 80 transmits the display count command to the information extracting apparatus 50. The display count command is a command to make the information extracting apparatus 50 calculate the conference ID attend same conference last time and the number of times attend same conference, which are included in the overall index, with the user information IU stored in the information database 70.

Then, the count end notification is received from the information extracting apparatus 50. The information retrieval apparatus 80 searches the user information IU of the user stored in the information database 70, for the person ID of the person whose name is the personal information and starts from A of alphabetic order, thumbnail created by the conference attend same conference last time, the number of times attend same conference, and name.

The afore-described thumbnail created by the conference attend same conference last time is obtainable by searching the conference information IM of the user information IU of the user, on the basis of the conference ID attend same conference last time and the person ID.

In accordance with the present embodiment of the present invention, it is possible to create the thumbnail created by the conference attend same conference first time, instead of the thumbnail created by the conference attend same conference last time. The search result is then sent to the display apparatus 90. The information retrieval apparatus 80 records the relationship between the thumbnail and the person ID.

The display apparatus 90 receives the search result and displays the thumbnail, the number of times attend same conference, and the name on the episodic information display screen 92, as shown in FIG. 17, yet does not show the information on the personal information display screen 93 or on the conference bibliography information display screen 94.

In this manner, the display apparatus 90 displays the initial state of the name list display screen. With this configuration, it is possible to search the episodic information for a name, which is included in the personal information, even if the information on the conference or personal information is completely forgotten. On the way around, even if the episodic information is forgotten completely, the episodic information can be searched for with the name included in the personal information.

Then, a description will be given of an operation when the user changes the display of "A" on the episodic information display screen 92.

First, the user manipulates the mouse or the like to move a pointer Pt on the display screen 91, and then manipulates an alphabetic button BTG. Then, the user selects an alphabetic button BTG2 that displays "B" to display on the display screen 92, the episodic information such as the thumbnail or the like of the person whose name starts from "B" of alphabetic order.

Subsequently, the information retrieval apparatus 80 searches the information database 70 for the thumbnail, the number of times attend same conference, and the name of the person whose name of the personal information starts from "B" of alphabetic order, and then transmits the search result to the display apparatus 90. The display apparatus 90 receives the search result and displays the search result on the episodic information display screen 92.

Now, a description will be given of the operation when the user searches the personal information and the conference bibliography information, for the participant that is identified by the thumbnail or name being displayed on the episodic information display screen 92. As shown in FIG. 18, the system user manipulates the pointer Pt to operate a thumbnail MSN displayed on the episodic information display screen 92.

The information retrieval apparatus 80 searches the user information IU of the user stored in the information database 70, for the date of the conference that the selected person attended, the conference bibliography information, and the personal information of the person who is selected, on the basis of the person ID of the person who is identified by the selected thumbnail. The conference bibliography information that has been obtained is sorted by the date of the conference. Then, the information retrieval apparatus 80 sends the search result to the display apparatus 90.

In order to search for the conference that the selected person attended, the information retrieval apparatus 80 searches the conference bibliography information stored in the user information IU of the user accumulated in the information database 70, under the conditions that the person ID of the selected person is stored in the conference participant of the conference bibliography information.

In order to search for the personal information of the selected person, the information retrieval apparatus 80 acquires the conference ID attend same conference last time included in the overall index, from the user information IU of the user stored in the information database 70.

The information retrieval apparatus 80 searches the user information IU of the user for the personal information stored in the conference information IM that is identified by the conference ID obtained, on the basis of the person ID of the selected person.

The display apparatus 90 receives the search result, and displays the personal information of the selected person on the personal information display screen 93, as shown in FIG. 17. The conference bibliography information of the conference that the selected person attended is displayed as a list on the conference bibliography information display screen 94 in a time-series manner.

With the afore-mentioned configuration, it is possible to search the episodic information for the name, which is the personal information, even if the information on the conference or personal information is completely forgotten.

Now, a description will be given for an operation to confirm the representative shot of the person selected by the user. Referring now to FIG. 18, the user manipulates the representative shot display button BTP by the pointer to select the person whose representative shot is displayed or sound thereof is emitted.

The information retrieval apparatus 80 transmits the display count command to the information extracting apparatus 50 to calculate the total number of conversation times and total number of remark times, which are included in the overall index, of the user information IU of the user. Then, the information retrieval apparatus 80 receives the count end notification from the information extracting apparatus 50.

The information retrieval apparatus 80 obtains the conference ID attend same conference last time, total number of conversation times, and total number of remark times, which are included in the overall index IXA, from the user information IU of the user, according to the person ID of the selected person. In addition, the information retrieval apparatus 80 searches the user information IU of the user for the conference information IM to obtain the representative shot information on the basis of the conference ID attend same conference last time.

Subsequently, the captured-image file FM and the pickup file FA to be identified by the representative shot information are acquired from the conference database 40 to obtain the representative shot.

The information retrieval apparatus 80 sends the search result and the representative shot image that have been obtained to the display apparatus 90, and also sends the representative shot sound to the sound emitting apparatus (hereinafter, simply referred to as speaker) 100. The display apparatus 90 displays the total conversation times, total remark times, and representative shot image of the selected person, and the speaker 100 emits the representative shot sound.

With the afore-described configuration, it is possible to search the information on the conference and the personal information for the episodic information, even if the episodic information is completely forgotten.

With the afore-described configuration, it is possible for the system user to search for the personal information of the conference participant on the basis of the sound and conversation content at the time of conversation. In particular, the conversation content is easy to remember and the system user is able to search for the personal information of the participant with ease. In the same manner, with the afore-described configuration, it is possible for the system user to search for the personal information of the conference participant on the basis of the sound and remark content at the time of conversation. In particular, the remark content is easy to remember as well as the conversation content and the system user is readily able to search for the personal information of the participant.

With the afore-described configuration, it is possible for the system user to search for the personal information of the conference participant on the basis of the appearance at the time of conversation. In particular, the personal appearance at the time of conversation is easy to remember and the system user is easily able to search for the personal information of the participant. In the same manner, it is possible for the system user to search for the personal information of the conference participant on the basis of the appearance at the time of remark. In particular, the personal appearance at the time of remark is easy to remember as well as at the time of conversation and the system user is easily able to search for the personal information of the participant.

With the afore-described configuration, it is possible for the system user to set the search condition easily to search for the personal information, if the system user is able to partially remember the name of the conference participant.

A description will be given of an operation when the episodic information is searched for from the conference bibliography information. First, as shown in FIG. 19, the user selects one of the conference bibliography information being displayed in a list on the conference bibliography information display screen 94, by the pointer Pt. This operation displays the information on the thumbnail or the like relating to the conference participant on the episodic information display screen 92. Here, the conference selected is referred to as selected conference, and the screen is referred to as participant display screen.

The information retrieval apparatus 80 searches for the name, thumbnail, the number of conversation times, and slide, the name being the personal information of the participant of the selected conference, the thumbnail being the episodic information, the slide being used in the conference. The information retrieval apparatus 80 stores the relationship between the thumbnail and the person ID.

The above-described search method will be described hereafter. The information retrieval apparatus 80 searches the user information IU of the user stored in the information database 70 for the conference information IM on the basis of the conference ID of the selected conference. The information retrieval apparatus 80 obtains the name, the thumbnail, the number of conversation times of all conference participants of the conference from the conference information IM that has been searched, the name being the personal information, the thumbnail being the episodic information. The slide is obtainable by searching the slide table TBL stored in the conference database 40 for the record accumulating the conference ID of the selected conference. This enables to search for the name of the participant, thumbnail, number of conversation times, and slide of the selected conference.

The information retrieval apparatus 80 sends the search result to the display apparatus 90. The display apparatus 90 changes the screen of the name list display screen shown in FIG. 17 to that of participant display screen shown in FIG. 19.

The participant display screen displays the episodic information display screen 92 included in the name list display screen, the personal information display screen 93, and the conference bibliography information display screen 94. What is different is that the participant display screen further displays a slide display screen 95. In addition, the participant display screen is different from the name list display screen in that the alphabetic button BTG is not displayed on the episodic information display screen 92.

The display apparatus 90 displays the thumbnail of the slide, which is a received search result, on the slide display screen 95. When the user operates a slide thumbnail by pointer, the display screen 100 displays the slide. Also, the name, thumbnail, and the number of conversation times of the participant of the selected conference are displayed on the information display screen 92.

With the afore-mentioned configuration, it is possible to search the information on the conference and the personal information for the episodic information, even if the episodic information is completely forgotten.

Now, a description will be given of an operation to confirm the representative shot of the selected person in the selected conference. The operation to be described hereafter is different from the above-described operation to confirm the representative shot in that the representative shot of the selected conference is confirmed. First, as shown in FIG. 20, the user operates the representative shot display button BTP by pointer to select the representative shot of the participant to be displayed or the sound thereof to be emitted.

The information retrieval apparatus 80 acquires the representative shot information, the number of conversation times, and the number of remark times of the selected person of the selected conference from the user information IU of the user of the information database 70, on the basis of the person ID of the selected person and the conference ID of the selected conference. Then, the information retrieval apparatus 80 further acquires the captured image file FM and the pickup sound file FA, which are identified by the representative shot information, from the conference database 40, in order to obtain the representative shot.

The information retrieval apparatus 80 sends the number of conversation times, number of remark times, which are the search result, and the representative shot image obtained, to the display apparatus 90, and further sends the representative shot sound to the speaker 100. The display apparatus 90 receives the search result. Then, the display apparatus 90 displays the number of conversation times, number of remark times, and the representative shot image, and the speaker 100 emits the representative shot sound.

With the afore-described configuration, it is possible to search the information on the conference and the personal information for the episodic information, even if the episodic information is completely forgotten.

When the screen is changed to the initial one that displays in an alphabetic order, the user operates a name list display change button BTN by pointer. Thus, the display apparatus 90 displays a name list display screen.

A description will be given of the operation of the user to display the thumbnail or the like in a time-series manner, on the basis of the date of the conference attend same conference last time. Referring to FIG. 19, the user selects a time-series display screen, from the menu of VIEW on the menu bar 96, by the pointer Pt. The display apparatus 90 displays the time-series display screen shown in FIG. 21.

The information retrieval apparatus 80 sends the display count command to the information extracting apparatus 50 so as to count the conference ID attend same conference last time, which is the overall index, in the user information IU of the user. Then, the information retrieval apparatus 80 receives the count end notification from the information extracting apparatus 50.

The information retrieval apparatus 80 acquires the date of the conference from the user information IU of the user, on the basis of the conference ID attend same conference last time. The thumbnail and name of the conference participant are searched under the condition that the date of the conference attend same conference last time that has been acquired belongs to this year, and then the dates of the conference attend same conference last time are sorted. The information retrieval apparatus 80 stores a relationship of the thumbnail and the person ID.

The information retrieval apparatus 80 transmits the search result to the display apparatus 90, and the display apparatus 90 receives the search result. Subsequently, the display apparatus 90 displays a list of the thumbnails according to the time series of the dates of the conferences attend same conference last time. The search result that cannot be displayed is displayed by manipulating a display month select button BTM by the pointer PT.

The user manipulates the representative shot display button BTP by the pointer to select the person whose representative shot is displayed. The information retrieval apparatus 80, the display apparatus 90, and the speaker 100 operate and function in the same manner as those displayed on the participant display screen.

The user operates a display year select button BTY by the pointer Pt. The information retrieval apparatus 80 changes to the search condition that the date of the conference attend same conference last time belongs to the selected year to carry out a search again. Then, the search result is transmitted to the display apparatus 90, and the display apparatus 90 displays the search result that has been received.

With the afore-described configuration, it is possible for the system user to set the search condition to search for the personal information of the conference participant with ease, if the conference participant roughly remembers the date of the conference.

A description will now be given of the user's operation so that the user sets various search conditions and search the thumbnail or the like. First, the user selects the search display screen from the menu of VIEW on the menu bar 96, by the pointer Pt. Then, the display apparatus 90 displays the search display screen shown in FIG. 22.

The search display screen is composed of the menu bar 96, a result display screen 97, and a condition setting screen 98. An episodic attribute, conference attribute, and person attribute can be set on the condition setting screen 98, as the search conditions.

The episodic attribute denotes the condition to be set by the information that belongs to the episodic information in the search conditions. The conference attribute denotes the condition to be set by the information that belongs to the conference bibliography information in the search conditions. The person attribute denotes the condition to be set by the information that belongs to the personal information in the search conditions.

When the user selects to display the search display screen, the display apparatus 90 displays selections that can be set as a predetermined search condition. The user operates a radio button BTR being displayed on the condition setting screen 98 by pointer to set the search condition.

When the seat distance in the conference is set for the search condition, the information retrieval apparatus 80 transmits the display count command to the information extracting apparatus 50 to count the seat distance in the conference, which is a conference index. The display count command is received from the information extracting apparatus 50.

The information retrieval apparatus 80 searches the conference information IM in the user information IU of the user for the thumbnail of the person who attended the same conference, which is the episodic information, and the name thereof, which is the personal information.

Subsequently, the information retrieval apparatus 80 transmits the search result to the display apparatus 90, and the display apparatus 90 receives the search result. The display apparatus 90 displays a list of the thumbnail and name that have been received on the result display screen 97. With the afore-described configuration, it is possible for the system user to search for the personal information of the person who adjacently attended in the conference, by setting the search condition of the seat distance to less than 3 meters.

If the seat distance in the conference is not set to the search condition, the information retrieval apparatus 80 does not transmit the display count command to the information extracting apparatus 50, but implements a search according to the search condition that has been set. The information retrieval apparatus 80 sends the search result to the display apparatus 90, and the display apparatus 90 displays a list of the thumbnail and name, which are the search results received, on the result display screen 97.

If "most frequent" is set to the conversation in the conference in the search condition, the participant having the highest number of conversation times in the conference is searched from the participants of the processed conference, who the user met before. The information retrieval apparatus 80 transmits the search result to the display apparatus 90, and the display apparatus 90 displays the thumbnail and name, which are the search result, on the result display screen 97. The information on the participant who has the "most frequent" in the number of conversation times is obtainable by acquiring a group of records having the same number of conversation times as the initial record when the search results are sorted in ascending sequence of the number of conversation times.

With the afore-described configuration, it is possible for the system user to search for the personal information of the person who has the highest number of conversation times with the system user among the conference participants, for example. In particular, it is easy for the system user to search for the personal information of the participant, because it is easy to remember someone who talked most frequently.

With the afore-described configuration, the display apparatus 90 is capable of distinctly displaying the participant who made a conversation with and the participant who did not.

In the same manner, if "most frequent" is set to the remark in the conference in the search condition, the participant having the highest number of remark times in the conference is searched from the participants of the processed conference, who the user met before. The information retrieval apparatus 80 transmits the search result to the display apparatus 90, and the display apparatus 90 displays the thumbnail and name, which are the search result, on the result display screen 97.

With the afore-described configuration, it is possible for the system user to search for the personal information of the person who has the highest number of remark times with the system user out of the conference participants, for example. In particular, it is easy for the system user to search for the personal information of the participant, because it is easy to remember someone who made a remark most frequently, in addition that it is easy to remember someone who talked most frequently.

The user operates the representative shot display button BTP by pointer to select someone who displays the representative shot and emits the sound thereof. The information retrieval apparatus 80, the display apparatus 90, and the speaker 100 operate and function in the same manner as displayed on the above-mentioned participant display screen.

Lastly, a description will be given of the user's operation to classify and display the thumbnail or the like on the basis of the forgetting level. First, the user selects a forgotten person display screen, from the menu of VIEW on the menu bar 96, by the pointer Pt. The display apparatus displays the forgotten person display screen.

Referring to FIG. 23, the screen of the forgotten person display screen is almost identical to that of the name list display screen shown in FIG. 17. The episodic information display screen 92 has a forgetting level button BTB, which is different from the alphabetic button BTG displayed on the name list display screen.

The episodic information display screen 92 displays thumbnail of the participant who attended the processed conference, according to forgetting levels, which are segmented by every 10%, such as 0% to 10%, more than 10% to 20%, and more than 20% to 30%. The forgetting level button BTB corresponds to the afore-described segments.

The information retrieval apparatus 80, the display apparatus 90, and the speaker 100 operate and function in the same manner as displayed on the name list display screen. Therefore, with the afore-described configuration, it is easy to set the search condition that is provided for searching the episodic information that has been forgotten.

The above-described count process, renewal process, and search process can be realized by creating a search query and a renewal query and implementing the renewal query with the information extracting apparatus 50, the forgetting level determination apparatus 60, and the information retrieval apparatus 80.

In the above-described embodiment, multiple camcorders are exemplarily described to compose the acquiring apparatus 10, yet the present invention is not limited to this. One camcorder may be employed.

In the above-described embodiment, a CCD camera is exemplarily described for the camcorder included in the acquiring apparatus 10, yet the present invention is not limited to this. For example, a camera or the like that employs a CMOS image sensor may be employed.

In the above-described embodiment, a sound pressure microphone is exemplarily described for the microphone included in the acquiring apparatus 10, yet the present invention is not limited to this. For example, a moving coil, ribbon, capacitor, or carbon microphone may be employed.

In the above-described embodiment, the acquiring apparatus 10 is exemplarily described to compose the RFID reader to obtain the positional information and the personal information of the conference participant, yet the present invention is not limited to this. For example, something a wireless LAN, ultrasonic sensor, or the like may be employed for obtaining the personal information and the positional information of the conference participant.

In the above-described embodiment, the acquiring apparatus 10 is exemplarily described for having one slide control apparatus, yet the present invention is not limited to this. Multiple slide control apparatuses may be employed, or no slide control apparatuses may be employed to record the light and dark in the room by an illumination meter.

In the above-described embodiment, the record analysis apparatus 20 is exemplarily described for analyzing the remark segment to store the analysis result in the conference database 40, yet the present invention is not limited to this. The remark segment may be manually extracted to store in the conference database 40.

In the above-described embodiment, the record analysis apparatus 20 is exemplarily described for analyzing the positional information of the conference participant to store the information in the conference database 40, yet the present invention is not limited to this. The positional information on the conference participant may be manually extracted to store in the conference database 40.

In the above-described embodiment, the record analysis apparatus 20 is exemplarily described for analyzing the slide switch signal to store the information or the like on the time while the slide was being displayed in the conference database 40, yet the present invention is not limited to this. The information or the like on the time while the slide was being displayed manually in the conference database 40 may be stored in the conference database 40.

In the above-described embodiment, the acquiring apparatus 10 is exemplarily described for having one slide control apparatus so that the slide is displayed on the screen by the projector, yet the present invention is not limited to this. The slide may be displayed or controlled by a liquid crystal display, plasma display, CRT display, or the like.

In the above-described embodiment, the information extracting apparatus 50 is exemplarily described for storing only the representative shot information in the information database 70, yet the present invention is not limited to this. The information extracting apparatus 50 may store the representative shot image and representative shot sound in the information database 70. With the afore-described configuration, a search process speed of the information retrieval apparatus 80 is increased.

In the above-described embodiment, the information extracting apparatus 50 is exemplarily described for storing the conference bibliography information relating to the processed conference in the information database 70, yet the present invention is not limited to this. The information extracting apparatus 50 may store only the conference ID relating to the processed conference in the information database 70. With this configuration, it is possible to maintain consistency of the conference bibliography information relating to the processed conference stored in the conference database 40.

In the above-described embodiment, the information extracting apparatus 50 is exemplarily described for storing the personal information of the participant who attended the processed conference in the information extracting apparatus 50 and the information database 70, yet the present invention is not limited to this. The information extracting apparatus 50 may store the person ID of the participant in the information database 70. With this configuration, it is possible to maintain consistency of the personal information stored in the personal database 30.

In the above-described embodiment, on a time-series display screen, the display apparatus 90 is exemplarily described for displaying the thumbnail or the like on the basis of the date of the processed conference that the system user and the participant attended last time, yet the present invention is not limited to this. The display apparatus 90 may display the thumbnail or the like on the basis of the date of the processed conference that the system user and the participant attended for the first time. In addition, the thumbnail or the like of an identical participant may be displayed multiple times, according to the date of the processed conference that the participant attended.

In the above-described embodiment, on the search screen, the display apparatus 90 is exemplarily described for displaying the number of conversation times, the number of remark times, the seat distance, or the like in the conference, as a search condition, and the information retrieval apparatus 80 is exemplarily described for carrying out a search according to the condition set from the search conditions being displayed. However, the present invention is not limited to this embodiment. The display apparatus 90 may display, as the search condition, the seat distance in conference, average distance in conference, total conference conversation period, average conference conversation period, total conference remark period, and average conference remark period, which are included in the overall index, or display the average seat distance, average distance, total number of conversation times, average number of conversation times, total conversation period, average total conversation period, average conversation period, total number of remark times, average number of remark times, total remark period, average total remark period, average remark period, and forgetting level, which are included in the overall index, or display a district of the conference and the conference room, which are included in the conference bibliography information, as the search condition. The information retrieval apparatus 80 may carry out a search on the basis of the condition set from the search conditions being displayed.

In the information retrieval system, there may be provided an information retrieval portion that displays the episodic information or the personal information stored in the information storage portion. With this configuration, the system user is able to set the search condition with ease when searching for the personal information. The information retrieval portion may display the episodic information or the personal information stored in the information storage portion on the basis of a name included in the personal information of the participant. The information retrieval portion may display the episodic information or the personal information stored in the information storage portion on the basis of a date of the conference that the system user attended.

In the information retrieval system, there may be provided a forgetting level determination portion that determines a forgetting level of the system user with respect to the episodic information stored in the information storage portion. The information retrieval portion may display a list of the episodic information stored in the information storage portion according to the forgetting level determined by the forgetting level determination portion, the episodic information being a search condition. This configuration allows the user to set the search condition easily when the user searches the episodic information forgotten.

According to the present invention, it is possible for the system user to search for the personal information of the participant, because the episodic information of the conference participant and the personal information obtained in the conference are stored in association with each other.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-280274 filed on Sep. 27, 2005 including specification, claims, drawings, and abstract is incorporated herein by reference in its entirety.

What is claimed is:

1. An information retrieval system comprising:
an information extracting apparatus that extracts episodic information on each participant of a plurality of participants of a conference from a sound and an image, both of which are captured and stored during the conference, the extracted episodic information being specific to each participant of the plurality of participants of the conference, the captured image including an image of the participants of the conference;
an information storage portion that stores the extracted episodic information associated with personal information related to each participant, the personal information being obtained from the conference that a system user attended; and
an information retrieval portion that retrieves the personal information stored in associated with the extracted episodic information based on any of the extracted episodic information that the system user inputs, wherein
the extracted episodic information includes number of conversation times, number of remark times, total conference conversation period, average conference conversation period, total conference remark period, average conference remark period, seat distance in conference, average distance in conference, total number of conversation times, average number of conversation times, total conversation period, average total conversation period, average conversation period, total number of remark times, average number of remark times, total remark period, average total remark period, average remark period, average seat distance, and average distance.

2. The information retrieval system according to claim 1, wherein the number of conversation times of the system user and the participant is the episodic information.

3. The information retrieval system according to claim 1, wherein a conversation sound extracted from the sound of the participant is used to extract the episodic information.

4. The information retrieval system according to claim 1, wherein a conversation image extracted from the captured image of the participant is used to extract the episodic information.

5. The information retrieval system according to claim 1, wherein the number of conversation times of the participant is the episodic information.

6. The information retrieval system according to claim 1, wherein a remark sound extracted from the sound of the participant is used to extract the episodic information.

7. The information retrieval system according to claim 1, wherein a remark image extracted from the captured image of the participant is used to extract the episodic information.

8. The information retrieval system according to claim 1, wherein positional information of the participant is used to extract the episodic information.

9. The information retrieval system according to claim 1, wherein the information retrieval portion displays the episodic information or the personal information stored in the information storage portion.

10. The information retrieval system according to claim 9, wherein the information retrieval portion displays the episodic information or the personal information stored in the information storage portion on the basis of a name included in the personal information of the participant.

11. The information retrieval system according to claim 9, wherein the information retrieval portion displays the episodic information or the personal information stored in the information storage portion on the basis of a date of the conference that the system user attended.

12. An information retrieval system comprising:
an information extracting apparatus that extracts episodic information on each participant from a sound and a captured image, which are stored during a conference, the episodic information being specific to each participant of a plurality of participants, the captured image including an image of the participants;

an information storage portion that stores the episodic information associated with personal information related to each participant, the personal information being obtained from the conference that a system user attended;

an information retrieval portion that retrieves and displays the personal information based on the episodic information; and a forgetting level determination portion that determines a forgetting level of the system user with respect to the episodic information stored in the information storage portion, wherein the information retrieval portion displays a list of the episodic information stored in the information storage portion according to the forgetting level determined by the forgetting level determination portion, and the episodic information being a search condition to search the stored episodic information that the system user has forgotten.

* * * * *